United States Patent
Adebahr et al.

(10) Patent No.: US 12,129,393 B2
(45) Date of Patent: *Oct. 29, 2024

(54) BINDER COMPOSITION AND USE THEREOF

(71) Applicants: WORLEE-CHEMIE GMBH, Hamburg (BE); DOW SILICONES CORPORATION, Midland, MI (US)

(72) Inventors: Thorsten Adebahr, Hamburg (DE); Joachim Müller, Ratingen (DE); David Pierre, Brussels (BE)

(73) Assignees: DOW SILICONES CORPORATION, Midland, MI (US); WORLEE-CHEMIE GMBH, Hamburg (DE)

( * ) Notice: Subject to any disclaimer, the term of this patent is extended or adjusted under 35 U.S.C. 154(b) by 1079 days.

This patent is subject to a terminal disclaimer.

(21) Appl. No.: 16/964,530

(22) PCT Filed: Jan. 23, 2019

(86) PCT No.: PCT/EP2019/051606
§ 371 (c)(1),
(2) Date: Jul. 23, 2020

(87) PCT Pub. No.: WO2019/145349
PCT Pub. Date: Aug. 1, 2019

(65) Prior Publication Data
US 2021/0032499 A1 Feb. 4, 2021

(30) Foreign Application Priority Data
Jan. 23, 2018 (EP) .................................. 18153079

(51) Int. Cl.
*C09D 7/61* (2018.01)
*C08G 77/08* (2006.01)
*C08G 77/12* (2006.01)
*C08G 77/16* (2006.01)
*C08G 77/20* (2006.01)
*C08L 77/08* (2006.01)
*C08L 77/12* (2006.01)
*C08L 83/06* (2006.01)
*C09D 5/00* (2006.01)
(Continued)

(52) U.S. Cl.
CPC ........... *C09D 183/06* (2013.01); *C08G 77/08* (2013.01); *C08G 77/12* (2013.01); *C08G 77/16* (2013.01); *C08G 77/20* (2013.01); *C08L 83/06* (2013.01); *C09D 5/00* (2013.01); *C09D 7/45* (2018.01); *C09D 7/61* (2018.01); *F16L 59/028* (2013.01); *C08G 2150/00* (2013.01); *C08G 2330/00* (2013.01); *C08G 2350/00* (2013.01); *C08K 3/36* (2013.01); *C08K 2201/001* (2013.01); *C08K 2201/005* (2013.01); *C08K 2201/006* (2013.01); *C08L 2205/02* (2013.01); *C08L 2312/08* (2013.01)

(58) Field of Classification Search
CPC .......... C09D 7/45; C09D 7/61; C09D 183/06; C09D 183/04; C09D 5/00; C09D 163/00; C08L 83/06; C08L 83/08; C08L 2312/08; C08K 2201/005; C08K 2201/006; C08K 7/26; C08G 77/08; C08G 77/12; C08G 77/16; C08G 77/20; C08G 2150/00; C08G 2330/00; C08G 2350/00; F16L 59/00

See application file for complete search history.

(56) References Cited

U.S. PATENT DOCUMENTS 2,676,182 A     4/1954    Herbert et al.
2,870,108 A *   1/1959    Nickerson ................ C08K 3/36
                                                                    106/490

(Continued)

FOREIGN PATENT DOCUMENTS

CN        103525297 A     1/2014
CN        104152890 A    11/2014

(Continued)

OTHER PUBLICATIONS

Tatsidjodoung et al. "A review of potential materials for thermal energy storage in building applications", Renewable and Sustainable Energy Reviews 18, pp. 327-349. (Year: 2013).*

(Continued)

*Primary Examiner* — Matthew E. Hoban
*Assistant Examiner* — Lynne Edmondson
(74) *Attorney, Agent, or Firm* — WARNER NORCROSS + JUDD LLP

(57) ABSTRACT

The present invention relates to a composition comprising a binder comprising one or more siloxane polymers, silicone resins, silicone based elastomers, and mixtures thereof, wherein said binder optionally comprises one or more cross-linker components comprising a silane and/or a siloxane containing silicon-bonded hydrolysable groups; and a hydrophilic powder and/or gel selected from one or more amorphous, porous hydrophilic silica (s) having a thermal conductivity at 20° C. and atmospheric pressure of 0.001 to 0.15 W/m·K and a surface area (SBET) of between 200 and 1500 m²/g, one or more hydrophilic aerogel (s) and mixtures thereof, wherein the binder is a solution, an emulsion, or a dispersion in water. The invention also relates to the use of the composition as or in thermally or acoustically insulating materials and to coated substrates, products and articles made by using the composition.

19 Claims, No Drawings

(51) Int. Cl.
      *C09D 7/45*    (2018.01)
      *C09D 183/06*  (2006.01)
      *F16L 59/00*   (2006.01)
      *F16L 59/02*   (2006.01)
      *C08K 3/36*    (2006.01)

(56) References Cited

U.S. PATENT DOCUMENTS

| | | | |
|---|---|---|---|
| 2,870,109 | A | 1/1959 | Nickerson |
| 2,893,962 | A | 7/1959 | Bartell |
| 3,382,205 | A | 5/1968 | Beers |
| 3,642,833 | A | 2/1972 | Wulff et al. |
| 4,481,102 | A | 11/1984 | Young et al. |
| 5,352,724 | A | 10/1994 | Fujiki et al. |
| 5,505,871 | A | 4/1996 | Harder et al. |
| 5,895,794 | A | 4/1999 | Berg et al. |
| 6,365,638 | B1 | 4/2002 | Schwertfeger et al. |
| 7,144,522 | B2 | 12/2006 | Burchill, Jr. et al. |
| 9,777,126 | B2 | 10/2017 | Williams et al. |
| 10,995,184 | B2 | 5/2021 | Iwanaga et al. |
| 11,802,217 | B2* | 10/2023 | Adebahr ............ F16L 59/00 |
| 2004/0077738 | A1 | 4/2004 | Field et al. |
| 2004/0142168 | A1 | 7/2004 | Hrubesh et al. |
| 2007/0290392 | A1* | 12/2007 | Lawton ............ F16L 59/028 427/407.1 |
| 2010/0279044 | A1* | 11/2010 | Williams ............ C08J 5/04 428/36.5 |
| 2012/0009412 | A1 | 1/2012 | Iwai et al. |
| 2012/0256336 | A1 | 10/2012 | Yano et al. |
| 2013/0022769 | A1 | 1/2013 | Sabri et al. |
| 2013/0033769 | A1 | 2/2013 | Duan et al. |
| 2019/0225498 | A1 | 7/2019 | Ruiz et al. |

FOREIGN PATENT DOCUMENTS

| | | |
|---|---|---|
| CN | 107236450 A | 10/2017 |
| CN | 107572538 A | 1/2018 |
| CN | 108299875 A | 7/2018 |
| EP | 0249944 A2 | 12/1987 |
| EP | 0260666 A2 | 3/1988 |
| EP | 0254993 A2 | 2/1998 |
| EP | 1101798 A2 | 5/2001 |
| EP | 1515796 B1 | 6/2007 |
| EP | 2663395 B1 | 3/2015 |
| FR | 3053263 A1 | 1/2018 |
| JP | 2711621 B2 | 2/1998 |
| JP | 2009-040966 A | 2/2009 |
| JP | 2009-062403 A | 3/2009 |
| JP | 2010-155946 A | 7/2010 |
| JP | 2011-157506 A | 8/2011 |
| JP | 2014-055075 A | 3/2014 |
| KR | 1020100002234 A | 1/2010 |
| KR | 1020100033396 A | 3/2010 |
| KR | 101137657 B1 | 4/2012 |
| WO | 2007021493 A2 | 8/2008 |
| WO | 2011000133 A1 | 1/2011 |
| WO | 2016010253 A1 | 1/2016 |
| WO | 2017069315 A1 | 4/2017 |
| WO | 2017164184 A1 | 9/2017 |

OTHER PUBLICATIONS

Machine assisted English translation of JP2009040966A obtained from https://worldwide.espacenet.com/patent on May 4, 2023, 13 pages.

Machine assisted English translation of JP2014055075A obtained from https://worldwide.espacenet.com/patent on May 4, 2023, 11 pages.

Machine assisted English translation of JP2009062403A obtained from https://worldwide.espacenet.com/patent on May 4, 2023, 19 pages.

Machine assisted English translation of JP2011157506A obtained from https://worldwide.espacenet.com/patent on May 4, 2023, 25 pages.

International Search Report for PCT/EP2019/051606 dated Feb. 13, 2019, 5 pages.

Machine assisted English translation of KR1020100002234A obtained from https://patents.google.com/patent on Jul. 22, 2020, 6 pages.

Machine assisted English translation of KR1020100033396A obtained from https://patents.google.com/patent on Jul. 22, 2020, 8 pages.

Machine assisted English translation of CN10352597A obtained from https://patents.google.com/patent on Jul. 22, 2020, 7 pages.

Machine assisted English translation of CN104152890A obtained from https://patents.google.com/patent on Jul. 22, 2020, 7 pages.

Machine assisted English translation of WO2016010253A1 obtained from https://patents.google.com/patent on Jul. 22, 2020, 6 pages.

Machine assisted English translation of WO2017069315A1 obtained from https://patents.google.com/patent on Jul. 22, 2020, 13 pages.

Tasca, A. L., Ghajeri, F., & Fletcher, A. J. (2018). Novel hydrophilic and hydrophobic amorphous silica: Characterization and adsorption of aqueous phase organic compounds. Adsorption Science & Technology, 36(1-2), 327-342. https://doi.org/10.1177/0263617417692339.

Enova® Aerogel Coatings for High Performance Applications, Cabot commercial document dated 2013, 6 pages.

Wikipedia Article for Aerogel as edited by ClueBot NG on Jan. 17, 2018, obtained via https://en.wikipedia.org/w/index.php?title=Aerogel&oldid=821007988 on Aug. 2, 2022, 14 pages.

Schäfer, Helmut, Barbara Milow, and Lorenz Ratke. "Synthesis of inorganic aerogels via rapid gelation using chloride precursors." RSC advances 3.35 (2013): 15263-15272.

Tasca, Andrea Luca, Farnaz Ghajeri, and Ashleigh J. Fletcher. "Novel hydrophilic and hydrophobic amorphous silica: Characterization and adsorption of aqueous phase organic compounds." Adsorption Science & Technology 36.1-2 (2018): 327-342.

Arkles, B. C., E. Kimble, and J. Goff. "Reactive Silicones: Forging New Polymer Links." Gelest Inc.: Morrisville, PA, USA (2016).

White, C., et al. "Advances in structural silicone adhesives." Advances in Structural Adhesive Bonding. Woodhead Publishing, 2010. 66-95.

DOWSIL™ 8005 Waterborne Resin Technical Data Sheet, dated 2017, 2 pages.

Machine assisted translation of KR101137657B1, obtained from https://patents.google.com/patent/KR101137657B1/en?oq=101137657 on Oct. 6, 2022, 8 pages.

Machine assisted English translation of CN107236450A obtained from https://patents.google.com/patent on Feb. 2, 2023, 6 pages.

Dasyam, Amrutha et al., "Acoustical Properties of Granular Aerogel Agglomerates", Journal of the Acoustical Society of America, vol. 151, A145, 2022.

The Norris Research Group (https://pamelanorris.wordpress.com/resources/physical-properties-of-silica-aerogels/), date unknown.

Machine assisted English translation of CN107572538A obtained from https://patents.google.com/patent on Aug. 18, 2024, 7 pages.

Machine assisted English translation of CN108299875A obtained from https://patents.google.com/patent on Aug. 18, 2024, 6 pages.

* cited by examiner

BINDER COMPOSITION AND USE THEREOF

CROSS-REFERENCE TO RELATED APPLICATIONS

This application is the National Stage of International Appl. No. PCT/EP2019/051606 filed on 23 Jan. 2019, which claims priority to and all advantages of European Appl. No. 18153079.1, filed on 23 Jan. 2018, the contents of which are hereby incorporated by reference.

FIELD OF THE INVENTION

The present invention is directed to a binder composition which is capable of providing thermal, acoustic and barrier insulation, in particular in applications such as marine, coating, building and construction and also automotive applications.

BACKGROUND OF INVENTION

Thermal and/or acoustic insulation is desirable in many technical applications.

It is known to prepare thermally insulating paints including inorganic particles such as hollow glass spheres or hydrophobic aerogels which have been treated with waterborne acrylic latexes as binder. The thermal insulation obtained with such materials is limited to a temperature range of up to about 120° C. Further, compositions are known which include a hydrophobic aerogel treated with film forming binder emulsions based on silicone compounds, which compositions can be used in thermal paint applications, where higher thermal stability of up to 250° C. is required. Insulation provided by layers of such compositions mainly allows for safe touch or energy savings.

Such known hydrophobic aerogel-based compositions are prepared by adding the hydrophobic aerogel to the emulsion binder material. Thereafter, the compositions are applied onto a substrate. However, when a hydrophobic aerogel is treated with a silicone film forming binder material, there are observed a composition viscosity increase and formation of cracks in the resulting dried film. Furthermore, when a hydrophobic aerogel is treated with a silicone-based binder emulsion, the latter has to be added just before application of the paint. Accordingly, the two components have to be stored separately.

WO 2016/010253 A1 describes an agricultural film with improved heat-retaining and thermal insulation properties, wherein an ethylene-vinyl acetate (EVA) resin, as a first component, is mixed with a surface-modified hydrophilic aerogel or a silylated aerogel, as a second component, and a polymer (EVA-g-MAH), as a third component, in which maleic anhydride is grafted to an EVA resin, and one or more components, as a fourth component, selected from a polyethylene wax and a silicone-modified polyethylene wax.

KR 2010/0033396 describes an aerogel coating composition. The hydrophobic surface of an aerogel is surface treated by way of complexing with a hydrophilic material. The thus treated composite is applied as a coating agent for insulation and soundproof.

WO 2017/069315 A1 describes a method for preparing a hydrophilic aerogel which may comprise the steps of preparing a hydrophobic aerogel and sintering the hydrophobic aerogel to prepare a hydrophilic aerogel.

KR 2010/0002234 describes a hydrophilic aerogel complex powder composition which contains 10-35 wt. % of aerogel selected from silica aerogel, carbon aerogel, alumina aerogel, and titanium aerogel, 20-65 wt. % of cement selected from micro cement, alumina cement, and blast furnace slag cement.

WO 2007/021493 A2 describes a coated composite comprising an aerogel material and a layer of a composition comprising an elastomeric or elastomer-forming polyorganosiloxane and a crosslinker for adding strength and increasing the ability to use in rugged environments.

US 2004/0077738 A1 describes an aerogel-hollow particle binder composition comprising an aqueous binder, hydrophobic aerogel particles and hollow, non-porous particles.

EP 1 515 796 B1 describes an aerogel-hollow particle binder composition comprising an aqueous binder, hydrophobic aerogel particles and hollow, non-porous particles.

EP 2 663 395 B1 describes a composite consisting of a hydrophobic and eosin functionalized silica aerogel core encapsulated by an outer PEG hydrogel layer.

U.S. Pat. No. 2,893,962 A describes a flexible continuous film or sheet comprising compounded synthetic material which includes silica aerogel particles the entire fibular structure of which is hydrophobic, which are bonded together with a latex with rubberlike properties.

U.S. Pat. No. 7,144,522 B2 describes a curable coating composition for forming a thermal insulating layer. The composition comprises a highly porous particulate aerogel material and a film-forming resin system comprising a film-forming polymer, such as an acrylic polymer, containing a stabilizer.

US 2004/0142168 A1 describes fibers and fabrics produced from the fibers which are made water-repellant, fire-retarded and/or thermally insulating by filling void spaces in the fibers and/or fabrics with a powdered material 1 to 500 nm in size which material among others may be derived from aerogel or aerogel-like material such as hydrophobic silica aerogel.

There is the need to provide new materials for improving thermal insulation. In particular, there is need for such new materials which can provide to articles a resistance to higher temperatures than those possible before and preferably also improved sound insulation and barrier insulation.

THE INVENTION

This above-mentioned object is solved by a composition of the present invention as defined in claim 1 which composition comprises a binder comprising one or more siloxane polymers, silicone resins, silicone-based elastomers, and mixtures thereof, wherein said binder may further comprise one or more cross-linker components such as a silane or a siloxane containing silicon-bonded hydrolysable groups, i.e., the binder may be a composition comprising the aforementioned components in combination; and a hydrophilic powder and/or gel selected from one or more amorphous, porous hydrophilic silica(s) having a thermal conductivity at 20° C. and atmospheric pressure of from 0.001 to 0.15 W/m·K and surface area (BET) of between 100 and 1500 m$^2$/g and, in particular, a pore size distribution of from 0.1 to 100 nm, one or more hydrophilic aerogel(s) and mixtures thereof, wherein the binder is a solution, an emulsion, or a dispersion in water.

Preferred embodiments are disclosed in the dependent claims.

According to one aspect of the present invention, embodiments comprising essential and/or non-essential components of the compositions of the present invention consist of those essential and, optionally, non-essential components.

The present invention also provides a composite comprising such a composition, a method of preparing same comprising treating the hydrophilic powder and/or gel with a silicon compound as defined above, for example by introducing the hydrophilic powder and/or gel into the silicon containing compound, and the use of such a composition as thermally or acoustically insulating material, paints, coatings, foamed articles, formed articles, injected articles, gaskets, sealants, adhesives, marine and piping. A composition of the present invention provides long-term stability prior to use, prevents viscosity drift and cracks at the surface of dried film layers subsequent to coating on substrates, even for high thickness coatings and products containing same. Furthermore, a one component approach is now possible in some embodiments, i.e., there is no longer a need for combining the components of the composition just before its use for forming, e.g., a paint or coating material, and its application onto the desired substrate. Furthermore, the composition of the invention allows for use at higher temperatures, because a hydrophilic powder and/or gel as described above is stable to temperatures up to 900° C., contrary to a hydrophobic aerogel, which has an upper temperature limit of about 300° C. (at which temperature degradation thereof occurs).

Hydrophilic Powder and/or Gel Component

The amorphous porous hydrophilic silica component of the present invention is a material which may be referred to as an aerogel-like material in that it is characterized by low thermal conductivity, i.e., a thermal conductivity in the range of from 0.001 to 0.15 W/mK, such as 0.01 to 0.10 or 0.05 W/mK, preferably 0.01 to 0.05, or 0.01 to 0.03 W/mK, determined at 20° C. and atmospheric pressure ($P_{atm}$).

The amorphous porous hydrophilic silica material has a porous structure and is based on an amorphous hydrophilic silicon dioxide, i.e., more than 90% (by weight) of the material is amorphous.

By "hydrophilic" it is meant that the material is readily dispersible in water (at ambient conditions such as 20° C. and $P_{atm}$). Accordingly, the material forms a stable dispersion with water unlike hydrophobic silicon dioxide materials of this type which when dispersed in water separate into a layer of material on the water surface. The hydrophilic character is due to the presence of hydrophilic groups on the surface including the inner pore surface of the material while a hydrophobic material is characterized by the presence of hydrophobic groups such as Si—$CH_3$ groups. This aspect is well-known in the art.

For example, the hydrophilic material according to the invention forms a stable dispersion with water which is characterized in that after mixing 1, 2, 5 or 8 g of material, such as Quartzene® Z1, with 60 g of distilled water in a plastic jar for 1 min at 20° C. using a SpeedMixer™ DAC 150.1FV mixer operated at 2,750 rpm and allowing the resulting mixture to stand for 60 min no visible phase separation or formation of a separate layer of material on the water surface takes place.

An example of a hydrophilic silica material according to the present invention is a silicia material like Quartzene® Z1 used in the inventive examples of the present application. Thus, the hydrophilic character of a silica material can also be illustrated/determined by comparing it to the exemplified material, e.g., with regard to its dispersibility in water under the conditions indicated above.

The amorphous porous hydrophilic silica material is stable up to high temperatures, i.e., up to temperatures of about 900° C. at $P_{atm}$. It is characterized by a surface area (BET) in the range of from about 200 to 1,500 $m^2/g$, such as 200 to 1,000 or 800 $m^2/g$, in particular 200 to 500 or 800 $m^2/g$. Furthermore, it may be characterized by a pore size distribution in the range of from 0.1 to 100 nm, such as 0.5 or 1 to 80 or 90 nm, in particular 1 to 50 nm.

The properties of the above material are comparable to those of silica aerogels in that both materials have skeletal structures composed of porous silica, very low densities and very low thermal conductivities. A significant physical difference is that the above material is produced as a powder and not as a gel from a sol gel process. This is associated with the advantage of avoiding the more expensive conditions used for the preparation of traditional aerogels produced by supercritical drying or resin-reinforcement/calcination processes at sub-critical conditions.

Methods for preparing the above materials are disclosed, for example, in "Novel hydrophilic and hydrophobic amorphous silica: Characterization and adsorption of aqueous phase organic compounds" by A. L. Tasca, F. Ghajeri and A. J. Fletcher, Adsorption Science & Technology, 2017, 1-16, section entitled "Experimental—Adsorbents", the disclosure of which is fully incorporated herein by reference.

The term "aerogel" is used to describe a synthetic, highly porous, ultralight material derived from a gel, the liquid components of which have been replaced with a gas (air). In other words, an aerogel is a gel with a gas (air) as dispersion medium. Historically the most common method of preparation was by drying a wet sol-gel at temperatures above the critical temperature and at a pressure above the critical pressure. This kind of drying drives off the liquid contained in the gel, e.g., water, and results in a porous structure without damaging the solid matrix structure of the gel. Up to 99.98% of the volume of aerogels may consist of pores. Thus, e.g., up to 99.98 vol. %, such as 90 to 98.5 vol. % or about 97 vol. %, of an aerogel may be air. Aerogels are micro- or nanoporous open cell solids, rigid and dry materials. Typically they comprise a porous solid network, and due to such a structure they are ultralight. The resulting aerogel in addition to low density has thermally insulating properties, i.e., low thermal conductivity. Other methods of manufacture are now used to produce similar products.

An aerogel may be based on inorganic or organic materials, e.g., silica, magnesia, titania, zirconia, alumina, chromia, tin dioxide, lithium dioxide, ceria and vanadium pentoxide, and mixtures of any two or more thereof, and organic carbon containing polymers (carbon aerogels).

The aerogels of the present invention are hydrophilic and preferably are hydrophilic silica aerogels.

Such hydrophilic silica aerogels are typically prepared by precipitating silica from alkali metal silicate solutions, rinsing the precipitated silica, collecting the rinsed silica, and drying same using super-critical drying conditions or sub-supercritical drying conditions, or drying same as mentioned before after exchange of the contained water with $CO_2$ or a suitable organic solvent, e.g. ethanol.

Alternatively, hydrophilic silica aerogels may be prepared under sub-critical conditions, as disclosed, e.g., in U.S. Pat. No. 6,365,638, in particular at column 3, lines 20 to 62 and in Examples 1 and 2 at column 4, lines 1 to 63, in particular Example 1. These disclosures are incorporated herein by reference.

The hydrophilic powder and/or gel suitable for use in the present invention usually comprises particles having an average particle size in the range of 3 nm to 500 μm, preferably 1 to 100 μm, more preferred 1 to 50 μm, still more preferred 1 to 40 μm, as measured by means of laser light scattering (e.g., according to ASTM D4464-15) and/or agglomerates thereof.

The hydrophilic powder and/or gel as described above typically comprise aggregates and agglomerates of precipitated porous primary silica particles.

The size of the aggregates/agglomerates may range from 1 μm to 3000 μm, as determined, for example, by means of laser light scattering (ASTM D4464-15). The particle size of the primary silica particles forming the aggregates/agglomerates may range from 1 nm to 500 nm, preferably 1 or 3 to 50 nm, as determined, for example, by means of light scattering (ASTM D4464-15).

According to a preferred aspect, the amorphous, porous hydrophilic silica component of the present invention has a particle size distribution of from about 1 to 40 μm, with d(10) of about 2 μm, d(50) of about 4 to 6 μm and d(90) of about 10 to 14 μm. Preferably, it has a pore size distribution of about 1 to 50 μm. Additionally, preferably, it has a porosity of about 95 to 97%, said parameters determined by using the methods disclosed herein. Preferably, the characteristics are present in combination.

The amorphous, porous hydrophilic silica and silica aerogels described above typically have densities of from 0.02 to 0.2 g/cm$^3$, and/or a BET surface area typically of from 100 g/m$^2$ to 1500 m$^2$/g or greater, preferably in the range of from 100 or 200 to 1000 m$^2$/g, more preferably from 200 to 800 m$^2$/g, and/or a thermal conductivity of from 0.001 to 0.15 W/m·K at about 20° C. and atmospheric pressure, such as 0.005 or 0.01 to 0.05 or 0.1 W/m·K.

Methods for determining BET surface are well known in the art, such as method ISO 9277.

The pore size of the powder and/or gels can be determined by gas adsorption (typically nitrogen). These methods are well-known in the art. Typically, pore size is in the micrometer or nanometer range, preferably in the nanometer range. Suitable pore size distributions are 0.1 to 100 nm, alternatively, 1 to 75 nm, alternatively 1 to 50 nm. Typically these values can be determined by using ASTM D4222-03 (2015) e1 or ASTM D4641-12.

As disclosed hereinabove, the hydrophilic powder or gel component of the present invention is highly porous. Thus, typically, the porosity (intra-/inter-particle porosity) is higher than 90%.

The solid portion of the amorphous, porous hydrophilic silica described above usually consists of more than 90% amorphous hydrophilic silicon dioxide.

They typically form a stable phase when dispersed in a liquid dispersion medium such as water, although they are not water-soluble in the strict sense of the word.

To the contrary, the solid portion of hydrophobic silica-based aerogels usually consists of more than 90% of hydrophobized amorphous silicon dioxide. Hydrophobic aerogels are neither water-soluble nor water-dispersible. They separate to form a layer on the water surface.

Binder Based on Siloxane Polymers, Silicone Resins and/or Silicone-Based Elastomers The hydrophilic powder and/or gels used in the present invention are treated/combined with a binder comprising one or more siloxane polymers, silicone resins, silicone-based elastomers, and mixtures thereof. Said binder may further comprise one or more cross-linker components such as a silane or a siloxane containing silicon-bonded hydrolysable groups. Thus, the binder may be a composition containing the aforementioned components in combination and, optionally, further components as disclosed hereinbelow.

The siloxane polymers may comprise straight chain and/or branched organopolysiloxanes comprising multiple groups of the formula (1)

wherein each R' may be the same or different and denotes a hydrocarbon group having from 1 to 18 carbon atoms, a substituted hydrocarbon group having from 1 to 18 carbon atoms or a hydrocarbonoxy group having up to 18 carbon atoms and e has, on average, a value of from 1 to 3, preferably 1.8 to 2.2.

For the purpose of this application "substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Particularly preferred examples of groups R' include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Preferably, at least some and more preferably substantially all of the groups R' are methyl. Some R' groups may be phenyl groups or fluoro groups. In one alternative, the polydiorganosiloxanes are largely polydialkylsiloxanes and/or polydialkylalkylphenylsiloxanes having at least two reactive groups per molecule. The reactive groups being carbinol groups (C—OH), silanol groups (Si—OH), silicon-hydrolysable groups, e.g. alkoxy groups (Si—OR), alkenyl groups (Si-alkenyl, e.g. vinyl) and/or silicon bonded hydrogen groups. Organopolysiloxane polymers as defined herein may also be understood to include siloxane and/or silane modified organic polymers, such as those referred to as "silicone polyesters" "silicone acrylates," silicone polyethers" and "silicone epoxys".

Silicone resins according to the present disclosure generally may be depicted using the following general formula of the following groups $(R^1R^2R^3SiO_{1/2})_a(R^4R^5SiO_{2/2})_b(R^6SiO_{3/2})_c(SiO_{4/2})_d$. (often referred to as M, D, T, or Q units respectively) with, a+b+c+d=1, (when a, b, c and d are mole fractions) with the resin having a weight-average molecular weight between about 50 to 1,000,000, alternatively 5000 to 500,000 on a standard polystyrene basis by gel permeation chromatography.

The resins may be reactive or non-reactive, depending on the composition into which they will be included. Hence, each $R^1$-$R^6$ is independently selected from a monovalent hydrocarbon groups, a carbinol group, an alkoxy group (preferably methoxy or ethoxy) or an amino group. Suitable exemplary monovalent hydrocarbon groups include, but are not limited to, alkyl groups such as methyl, ethyl, propyl, pentyl, octyl, undecyl, and octadecyl; alkenyl groups such as vinyl, allyl and hexenyl, cycloalkyl groups such as cyclopentyl and cyclohexyl; and aryl groups such as phenyl, tolyl, xylyl, benzyl, and 2-phenylethyl, and any combination thereof.

The reactive groups in this component may be located at terminal, pendant (non-terminal), or both terminal and pendant positions. An example of a suitable resin is an MQ resin which comprises substantially only M units ($R^1R^2R^3SiO_{1/2}$)

and Q units ($SiO_{4/2}$). They may contain minor amounts of D units ($R^{12}R^5SiO_{2/2}$) and/or T units ($R^6SiO_{3/2}$).

The silicone based elastomer may include a suitable silicone elastomeric product which is reaction product of a siloxane polymer having at least two —OH groups per molecule, or polymer mixture having at least two —OH groups per molecule, a cross-linker and optionally a condensation cure catalyst. In a preferred alternative silicone based elastomer is a reaction product of a siloxane polymer having at least two —OH groups per molecule, or polymer mixture having at least two —OH groups per molecule, having a viscosity of between 5,000 to 500,000 mPa·s at 25° C., and at least one self catalyzing crosslinker reactive with the polymer.

The siloxane polymers, silicone resins, silicone-based elastomers, and mixtures thereof, optionally including silane or siloxane-based crosslinkers, may be used in combination with other co-binders and/or hardeners. When organic (co-) binders and/or hardeners are used such combinations are also referred to as hybrid binder systems.

The terms "binder", "co-binder" and/or "hardener" are used to refer to chemicals and/or chemical compositions that will—by chemical reaction and physical modification—generate a network leading to film formation, by itself (binder), or with other similar binder(s) (co-binder) and/or with other non-similar binder(s) (hardener).

Binders suitable for use in the compositions of the present invention may contain a dissolving/dispersing/emulsifying liquid (also referred to as being solvent-containing) or are free of a dissolving/dispersing/emulsifying liquid (also referred to as being solventless).

An emulsion binder may comprise a homogeneous siloxane polymer, and/or silicone resin based liquid phase in water or the like and optionally a surfactant. Typically for an "oil in water" emulsion the homogeneous siloxane polymer, and/or silicone resin based liquid phase forms the disperse phase and the water or the like forms the continuous phase of the emulsion.

A dispersion binder comprises an inhomogeneous liquid phase in water or organic solvent or a non-reactive silicone based fluid; The inhomogeneous liquid phase may contain one or more siloxane polymers, and/or silicone resin based in addition to the silicone based fluid (when present), and optionally a surfactant.

A solution binder contains siloxane polymers, silicone resins based compositions dissolved in water, a compatible organic solvent or a non-reactive silicone based fluid. Solution binders as hereinbefore described may contain one or more siloxane polymer and/or silicone resin based compositions in addition to the silicone based fluid (when present). In cases where a compatible organic solvent is utilised said solvent may be an aromatic or non-aromatic solvent, in particular xylene, methoxy propyl acetate (PMA), dibasic esters (DBE) such as esters of adipic acid, glutaric acid, and succinic acid, or alcohols such as ethanol. The silicone based fluid may for example be a trimethylsilyl terminated polydimethylsiloxanes having a viscosity at 25° C. of from 100 to 50,000 mPa·s.

A solventless binder contains a homogeneous liquid containing one or more silicon containing compounds.

A solid binder contains a homogeneous solid containing one or more silicon containing materials. It can be in powder, pellet or block form.

When the siloxane polymer comprises two or more silanol groups and/or Si-hydrolysable reactive groups the binder concerned is condensation curable and will additionally include a cross-linking compound, a condensation cure catalyst and optionally reinforcing filler or non-reinforcing filler and/or a silicone resin. The fillers exclude hydrophilic silica powder and/or aerogels as hereinbefore described.

When the siloxane polymer has Si-alkenyl or Si—H reactive groups the binder concerned is addition curable and will include a cross-linking compound, an addition cure catalyst and optionally cure inhibitor, reinforcing filler or non-reinforcing filler and/or a silicone resin. The fillers exclude hydrophilic silica powder and/or aerogels as hereinbefore described.

When the binder contains a silicone-based elastomer the binder composition may be a silicone water based elastomer (SWBE) emulsion.

In one embodiment the hydrophilic powder and/or gels are introduced into an emulsion type binder, which may for example be based on addition cure compositions as described above or emulsions of silicone-water-based elastomer (SWBE). Such emulsion-type binders preferably are composed of surfactant, binder and water.

Si-carbinol binders are based on silicone and/or siloxane compounds and have —C—OH (end-) groups.

Hydrosilylation siloxane binders are composed of addition cure compositions as described above. They may be cured by heat UV light/electron beam (EB) depending on the application in which they are used.

Hybrid compositions will include silicon containing materials e.g. as described herein but may also contain suitable co-binders or hardeners comprise inorganic or organic binders, preferably selected from amino hardeners such as 1,6 hexamethylenediamine, carboxylic acids e.g. salicylic acid, isocyanates e.g. toluene diisocyanate, specifically organic amines, organic epoxy resins bisphenol A-epichlorohydrin epoxy resin, organic carboxylic acids, organic acetals, organic anhydrides Benzene-1,2,4-tricarboxylic anhydride, organic aldehydes, polyolefins polyethylene or polypropylene, thermoset and thermoplastic binders.

The composition of the present invention comprises 1.0 to 80.0% by weight of the hydrophilic powder and/or gel and 20.0 to 99.0% by weight of the binder, preferably 1.0 to 20.0% by weight of the hydrophilic powder and/or gel and 80.0 to 99.0% by weight of the binder, more preferred 5.0 to 10.0% by weight of the hydrophilic powder and/or gel and 90.0 to 95.0% by weight of the binder.

In case of solution, dispersion or emulsion type binders, the composition contains from 15.0 to 90.0% by weight of dissolving/dispersing/emulsifying liquid, based on the total weight of the binder, preferably 30.0 to 60.0% by weight.

DETAILED DESCRIPTION OF THE INVENTION

The invention is directed to a composition comprising hydrophilic powder and/or gel treated with a silicon compound/composition based binder, and its use for forming an insulative layer.

When present hydrophilic aerogels suitable for use in the present invention may be a silica aerogel, magnesia aerogel, titania aerogel, zirconia aerogel, alumina aerogel, chromia aerogel, tin dioxide aerogel, lithium dioxide, ceria and vanadium pentoxide, a mixture any two or more thereof, or a carbon aerogel, preferably it is a silica aerogel.

The hydrophilic powder and/or gels of the present invention as defined in claim 1 are preferably amorphous, porous hydrophilic silicas and/or hydrophilic silica aerogels as described above.

Typically said amorphous, porous hydrophilic silicas and/or hydrophilic silica aerogels are in powder form. As mentioned above, the particle size is in the range of 1 or 3 nm to 500 μm.

Condensation Curable Binder

A Condensation Curable Binder may comprise (ai) a siloxane polymer having at least two terminal hydroxyl or hydrolysable groups and a viscosity of from 10 to 200,000, alternatively 2000 to 150000 mPa·s at 25° C., as can be determined by means of a rotational viscosimeter such as a Brookfield viscosimeter or by using a Glass Capillary Viscosimeter based on ASTM D-445, IP 71. The siloxane polymer (ai) may be described by the following molecular Formula (2)

$$X_{3-c}R^7_c Si\text{—}O\text{—}(R^8_y SiO_{(4-y)/2})_z\text{—}Si\text{—}R^7_c X_{3-c} \quad (2)$$

where
c is 0, 1, 2 or 3,
b is 0 or 1,
z is an integer from 300 to 5000 inclusive,
y is 0, 1 or 2 preferably 2.
At least 97% of the $R^1_y SiO_{(4-y)/2}$ are characterized with y=2.
X is a hydroxyl group or any hydrolyzable group,
Each $R^7$ is individually selected from aliphatic organic groups selected from alkyl, aminoalkyl, polyaminoalkyl, epoxyalkyl or alkenyl alternatively alkyl, aminoalkyl, polyaminoalkyl, epoxyalkyl groups having, in each case, from 1 to 10 carbon atoms per group or alkenyl groups having in each case from 2 to 10 carbon atoms per group or is an aromatic aryl group, alternatively an aromatic aryl group having from 6 to 20 carbon atoms and Most preferred are the methyl, ethyl, octyl, vinyl, allyl and phenyl groups.

Each $R^8$ is individually selected from the group consisting of X, alkyl groups, alternatively alkyl groups having from 1 to 10 carbon atoms, alkenyl groups alternatively alkenyl groups having from 2 to 10 carbon atoms and aromatic groups, alternatively aromatic groups having from 6 to 20 carbon atoms. Most preferred are methyl, ethyl, octyl, trifluoropropyl, vinyl and phenyl groups. It is possible that some $R^8$ groups may be siloxane branches off the polymer backbone which may have terminal groups as hereinbefore described.

Most preferred $R^8$ is methyl.

Each X group of siloxane polymer (ai) may be the same or different and can be a hydroxyl group or a condensable or hydrolyzable group. The term "hydrolyzable group" means any group attached to the silicon which is hydrolyzed by water at room temperature. The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy.

Siloxane polymer (ai) can be a single siloxane represented by Formula (2) or it can be mixtures of siloxanes represented by the aforesaid formula. The term "siloxane polymer mixture" in respect to component (ai) is meant to include any individual siloxane polymer (ai) or mixtures of siloxane polymers (ai).

Cross-Linker (bi)

The crosslinker (bi) in a condensation curable binder may be one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, isobutoxy and propoxy) and alkenyloxy groups (for example isopropenyloxy and 1-ethyl-2-methylvinyloxy).

The molecular structure of siloxane based cross-linkers (bi), when present, can be straight chained, branched, or cyclic.

When present, the crosslinker (bi) preferably has at least three or four silicon-bonded condensable (preferably hydroxyl and/or hydrolysable) groups per molecule which are reactive with the condensable groups of siloxane polymer (ai) in the base component. When crosslinker (bi) of the catalyst package is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as crosslinkers include bis (trimethoxysilyl)hexane, 1,2-bis (triethoxysilyl) ethane, alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, dibutoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

Catalyst (ci)

A third ingredient is a suitable condensation catalyst for catalysing the cure reaction. These are typically tin based catalysts or titanate/zirconate catalysts which are chosen dependent on other ingredients in the composition. Examples of tin catalysts include tin triflates, organic tin metal catalysts such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dimethyltin dineodecanoate (DMTDN) and dibutyltin dioctoate.

Titanate and/or zirconate based catalysts may comprise a compound according to the general formula $Ti[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{22}$ include but are not restricted to methyl, ethyl, propyl, isopropyl, butyl, tertiary butyl and a branched secondary alkyl group such as 2,4-dimethyl-3-pentyl. Preferably, when each $R^{22}$ is the same, $R^{22}$ is an isopropyl, branched secondary alkyl group or a tertiary alkyl group, in particular, tertiary butyl.

Alternatively, the titanate or zirconate may be chelated. The chelation may be with any suitable chelating agent such as an alkyl acetylacetonate such as methyl or ethylacetylacetonate.

The Condensation Curable Binder may also include one or more finely divided, reinforcing fillers and/or non-reinforcing fillers (di). For the avoidance of doubt fillers (di) do not include hydrophilic powder and/or gels as hereinbefore described. Reinforcing fillers of (di) may include calcium carbonate, high surface area fumed silica and/or precipitated silica including, for example, rice hull ash. The condensation Curable Binder may also comprise one or more non-reinforcing filler (di) such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

In addition, the reinforcing filler and/or non-reinforcing filler (di) may be surface treated to render them hydrophobic. Treating agents used for such a purpose may be a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components. The surface treatment of the fillers makes them easily wetted by siloxane polymer (ai) and can be homogeneously incorporated into the silicone polymer (ai) of the base component. This results in improved room temperature mechanical properties of the uncured compositions.

The condensation cure binder may also include rheological modifiers; Adhesion promoters, pigments, Heat stabilizers, Flame retardants, UV stabilizers, Chain extenders, electrically and/or heat conductive fillers and/or Fungicides and/or biocides The condensation cure binder may be provided as either a one or two part organopolysiloxane sealant composition. A two part composition comprises in the first part polymer and filler (when required) and in the second part catalyst and cross-linker are provided for mixing in an appropriate ratio (e.g. from 1:1 to 10:1) immediately prior to use. Additional additives may be provided in either the first or second part of the two part composition.

Addition Curable Binder

The siloxane polymer used in an addition curable binder (aii) is generally the same as that for the condensation curable binder with the —OH groups or hydrolysable groups replaced by Si-alkenyl groups or Si—H groups, preferably Si-alkenyl groups. Typically the polymer will have 2 or more Si-alkenyl groups per molecule.

The viscosity of organopolysiloxane (aii) at 25° C. is typically within a range of from 10,000 to 1,000,000 mPa·s, alternatively from 10,000 to 500,000 mPa·s, alternatively from 10,000 to 100,000 mPa·s. Unless otherwise indicated, all viscosities are measured using a rotational viscometer such as a Brookfield viscometer, or by using a capillary rheometer.

Examples of the organopolysiloxane (aii) which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and mixtures thereof.

The organopolysiloxane (aii) may be either a single polymer, or a combination of two or more different polymers.

The organopolysiloxane (aii) is present in the binder component at a level of from 5 to 95% based on the total weight of the binder component, alternatively from 35 to 85% by weight, based on the total weight of the binder component, alternatively from 40 to 80% by weight based on the total weight of the binder component and further alternatively from 50 to 80% by weight based on the total weight of the binder component.

The addition curable binder further comprises an organopolysiloxane containing at least 2 silicon-bonded hydrogen atoms per molecule. There are no special restrictions with regard to the molecular structure of component (bii) that may have a linear, branched, cyclic, or a three-dimensional netlike molecular structure. There are no special restrictions with regard to viscosity of component (aii) at 25° C., but it may be recommended that this component has a viscosity ranging from 1 to 100,000 mPa·s at 25° C. Silicon-bonded organic groups used in component (bii) may be exemplified by methyl, ethyl, propyl, butenyl, pentenyl, hexyl, or similar alkyl groups; phenyl, tolyl, xylyl, or similar aryl groups; 3-chloropropyl, 3,3,3-trifluoropropyl, or similar halogenated alkyl group, preferable of which are methyl and phenyl groups.

Component (bii) can be exemplified by the following compounds: a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; dimethylsiloxane capped at both molecular terminals with dimethylhydrogensiloxy groups; a copolymer of a methylhydrogensiloxane and a dimethylsiloxane capped at both molecular terminals with dimethylhydrogensiloxy groups; a copolymer of a methylhydrogensiloxane and a methylphenylsiloxane capped at both molecular terminals with dimethylphenylsiloxy groups; a cyclic methylhydrogenpolysiloxane; a copolymer consisting of $(CH_3)_2HSiO_{1/2}$ siloxane units and $SiO_{4/2}$ units; a copolymer consisting of $(CH_3)_2HSiO_{1/2}$ siloxane units, $(CH_3)_3SiO_{1/2}$ siloxane units, and $SiO_{4/2}$ units, the aforementioned organopolysiloxanes in which a part or all methyl groups are substituted with ethyl, propyl, or similar alkyl groups; phenyl, tolyl, or similar aryl groups; 3,3,3-trifluoropropyl, or similar halogenated alkyl groups; or a mixture of two or more of the aforementioned organopolysiloxanes.

The organopolysiloxane (bii) is generally present in the binder component in an amount of from 0.1 to 15% by weight, based on the total weight of the binder component.

The organopolysiloxane (bii) is generally present in the binder component in an amount such that the ratio of the mole number of silicon-bonded hydrogen atoms of component (bii) to the mole number of alkenyl groups of component (aii) ranges from (0.7:1.0) to (5.0:1.0), preferably from (0.9:1.0) to (2.5:1.0), and most preferably from (0.9:1.0) to (2.0:1.0).

Typically dependent on the number of unsaturated groups in component (aii) and the number of Si—H groups in component (bii), component (bii) will be present in an amount of from 0.1 to 40% by weight of the binder component, alternatively from 0.5 to 20%, by weight of the binder component, alternatively 0.5 to 10% by weight of the binder component, further alternatively from 1% to 5% by weight of the binder component.

Component (cii) is one or more addition-reaction catalysts including catalysts selected form the platinum group metals, or transition metals, of the periodic table of the elements, such as platinum, ruthenium, rhodium, palladium, osmium and iridium; and compounds thereof. Component (cii) catalyses the reaction between the vinyl groups of component (aii) and the Si—H groups of component (bii) resulting in a cross-linked network when the composition is cured.

The catalyst used herein is preferably selected from the platinum based catalysts, such as chloroplatinic acid, chloroplatinic acid dissolved in an alcohol or a ketone and these solutions which have been ripened, chloroplatinic acidolefin complexes, chloroplatinic acid-alkenylsiloxane complexes, chloroplatinic acid-diketone complexes, platinum black, platinum supported on a carrier, and mixtures thereof.

The catalyst (cii) is added in a quantity sufficient to cure the organopolysiloxane (aii) and the organopolysiloxane (bii) present in the composition. For example, it may be added in a quantity of platinum atom that provides of from 0.1 to 500 weight-ppm (parts per million), alternatively of from 1 to 200 weight-ppm, alternatively of from 1 to 100 weight-ppm, of platinum atom in the catalyst (cii) based on the total weight of reactive organopolysiloxanes (aii) and (bii). Dependent on the ratios above typically there will be from 0.01% to 10% by weight of the binder component in the form of catalyst, alternatively 0.01% to 5% by weight of the binder component in the form of catalyst, further alternatively from 0.05% to 2% by weight of the binder component in the form of catalyst.

Component (dii) is one or more finely divided, reinforcing fillers and/or non-reinforcing fillers as hereinbefore described in relation to the condensation curable binder. As previously discussed such fillers may be hydrophobically treated to improve room temperature mechanical properties of the uncured compositions. Furthermore, the surface treated fillers give a lower conductivity than untreated or raw material.

Typically the fillers used will be in the form of fine powders having a specific surface area measured by BET method of from about 50 m²/g up to 450 m²/g.

Optionally the addition curable binder may comprise one or more optional Addition-reaction inhibitors (e) of platinum based catalysts are well known in the art. Addition-reaction inhibitors include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated eneynes, hydroperoxides, nitriles, and diaziridines.

The inhibitors (e) which may be utilised in the composition described above may be selected from the group consisting of acetylenic alcohols and their derivatives, containing at least one unsaturated bond. Examples of acetylenic alcohols and their derivatives include 1-ethynyl-1-cyclohexanol (ETCH), 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

Alternatively, the inhibitor is selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, and mixtures thereof.

The inhibitor (e) may typically be an acetylenic alcohols where the at least one unsaturated bond (alkenyl group) is in a terminal position, and further, a methyl or phenyl group may be at the alpha position. The inhibitor may be selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 1-phenyl-2-propynol, and mixtures thereof.

The inhibitor (e) may be added in the range of from 10 to 50,000 weight-ppm in the curable silicone elastomer composition.

When present the inhibitor (e) is present in an amount providing a molar ratio of inhibitor to the platinum atom of from 150:1 to 900:1, alternatively of from 150:1 to 700:1, alternatively of from 150:1 to 600:1.

The addition cure binder may also include rheological modifiers; Adhesion promoters, pigments, Heat stabilizers, Flame retardants, UV stabilizers, Chain extenders, electrically and/or heat conductive fillers and/or Fungicides and/or biocides The addition cure binder may be provided as either a one or two part organopolysiloxane sealant composition. A two part composition comprises in the first part polymer and filler (when required) and in the second part catalyst and cross-linker are provided for mixing in an appropriate ratio (e.g. from 1:1 to 10:1) immediately prior to use. Additional additives may be provided in either the first or second part of the two part composition.

Silicone Water Borne Elastomer (SWBE) Binder

A silicone water borne elastomer binder may comprise
(i) a cross-linked polysiloxane dispersion of a reaction product of
  (i) a siloxane polymer having at least two —OH groups per molecule, or polymer mixture having at least two —OH groups per molecule, having a viscosity of between 5,000 to 500,000 mPa·s at 25° C., and
  (ii) at least one self catalyzing crosslinker reactive with (i)(i), and additionally comprising (i) (c) a surfactant and (i) (d) water;
together with one or more of the following ingredients:
  (ii) one or more fillers (excluding hydrophilic powder and/or gels) selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime;
  (iii) one or more stabilizers;
  (iv) one or more rheology modifiers.

The reaction product (i) may additionally comprise one or more additives such as in-situ resin reinforcers and pH stabilizers. The dispersion is produced by mixing the above components at a sufficiently high shear to transform the mixture into a gel phase and by then diluting the gel with water to the desired silicone content.

The siloxane polymers or polymer mixtures (i)(i) used as starting materials for the reaction product (i) above have a viscosity between 5,000 to 500,000 mPa·s. at 25° C. using a recording Brookfield viscometer with Spindle 3 at 2 rpm according to ASTM D4287-00 (2010). The siloxane polymers are described by the following molecular Formula (3)

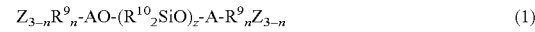

where n is 0, 1, 2 or 3, z is an integer from 500 to 5000 inclusive, Z is a hydrogen atom, a hydroxyl group and any condensable or any hydrolyzable group, A is a Si atom or an Si—(CH$_2$)$_m$—SiR$^{10}$$_2$ group, R$^9$ is individually selected from the group consisting of aliphatic, alkyl, aminoalkyl, polyaminoalkyl, epoxyalkyl, alkenyl or aromatic aryl groups and $R^{10}$ is individually selected from the group consisting of Z, aliphatic, alkyl, alkenyl and aromatic groups.

The siloxane polymer (i)(i) can be a single siloxane represented by Formula (3) or it can be mixtures of siloxanes represented by the aforesaid formula or solvent/polymer mixtures. The term "polymer mixture" is meant to include any of these types of polymers or mixtures of polymers. As used herein, the term "silicone content" means the total amount of silicone in the dispersed phase of the dispersion, from whatever source, including, but not limited to the silicone polymer, polymer mixtures, self catalytic crosslinkers, in situ resin reinforcers and stabilizers.

Each Z group may be the same or different and can be a hydrogen atom, hydroxyl group and any condensable or hydrolyzable group. The term "hydrolyzable group" means any group attached to the silicon which is hydrolyzed by water at room temperature. The hydrolyzable group Z includes hydrogen atom, halogen atoms, such as F, Cl, Br or I; groups of the Formula —OT, where T is any hydrocarbon or halogenated hydrocarbon group, such as methyl, ethyl, isopropyl, octadecyl, allyl, hexenyl, cyclohexyl, phenyl, benzyl, beta-phenylethyl; any hydrocarbon ether radical, such as 2-methoxyethyl, 2-ethoxyisopropyl, 2-butoxy-isobutyl, p-methoxyphenyl or —(CH$_2$CH$_2$O)$_2$CH$_3$; or any N,N-amino radical, such as dimethylamino, diethylamino, ethylmethylamino, diphenylamino or dicyclohexylamino; NH$_2$; any ketoxime radical of the formula —ON=CM$^1{}_2$ or —ON=CM' in which M$^1$, is any monovalent hydrocarbon or halogenated hydrocarbon radical, such as those shown for T above and M' is any divalent hydrocarbon radical, both valences of which are attached to the carbon, such as hexylene, pentylene or octylene; ureido groups of the formula —N(M$^1$)CONM''$_2$ in which M$^1$ is defined above and M'' is hydrogen atom or any of the above M$^1$ radicals; carboxyl groups of the formula —OOCM$^1$M'' in which M$^1$ and M'' are defined above or carboxylic amide radicals of the formula —NM$^1$C=O(M'') in which M$^1$ and M'' are defined above. Z can also be the sulphate group or sulphate ester groups of the formula —OSO$_2$(OM$^1$), where M$^1$ is as defined above; the cyano group; the isocyanate group; and the phosphate group or phosphate ester groups of the formula —OPO(OM$^1$)$_2$ in which M$^1$ is defined above.

The most preferred Z groups are hydroxyl groups or alkoxy groups. Illustrative alkoxy groups are methoxy, ethoxy, propoxy, butoxy, isobutoxy, pentoxy, hexoxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy. R is individually selected from the group consisting of aliphatic, alkyl, aminoalkyl, polyaminoalkyl, epoxyalkyl, alkenyl organic and aromatic aryl groups. Most preferred are the methyl, ethyl, octyl, vinyl, allyl and phenyl groups.

$R^{10}$ is individually selected from the group consisting of Z, aliphatic, alkyl, alkenyl and aromatic aryl groups. Most preferred are methyl, ethyl, octyl, trifluoropropyl, vinyl and phenyl groups.

When the siloxane polymer of formula (3) has an average of more than two condensable or hydrolyzable groups per molecule which are self-catalytic, it is not necessary to have the self catalytic crosslinker present separately to form a cross-linked polymer. The condensable or hydrolyzable groups on the different siloxane molecules can react with each other to form the required crosslinks.

The siloxane polymer (i)(i) can be a mixture of different kinds of molecules, for example, long chain linear molecules and short chain linear or branched molecules. These molecules may react with each other to form a cross-linked network. Such siloxanes, which can take the place of more conventional crosslinkers, are illustrated by low molecular weight organosilicon hydrides, such as polymethylhydrogensiloxane, low molecular weight copolymers containing methylhydrogensiloxy and dimethylsiloxy groups, —(OSi(OEt)$_2$)—, (ethylpolysilicate), (OSiMeC$_2$H$_4$Si(OMe)$_3$)$_4$ and (OSi—MeON=CR'$_2$)$_4$, where Me is methyl and Et is ethyl.

Advantageously, the siloxane polymer (i)(i) also comprises mixtures of siloxane polymers of formula (3), exemplified by, but not limited to, mixtures of α,ω-hydroxysiloxy terminated siloxanes and of α,ω-bis(triorganosiloxy) terminated siloxanes, mixtures of α,ω-hydroxylsiloxy terminated siloxanes and of α-hydroxy, ω-triorganosiloxy terminated siloxanes, mixtures of α,ω-dialkoxysiloxy terminated siloxanes and of α,ω-bis(tri-organosiloxy) terminated siloxanes, mixtures of α,ω-dialkoxysiloxy terminated siloxanes and of α,ω-hydroxysiloxy terminated siloxanes, mixtures of α,ω-hydroxysiloxy terminated siloxanes and of α,ω-bis(triorganosiloxy) terminated poly(diorgano)(hydrogenorgano)siloxane copolymers. The siloxane polymer of the invention can also comprise mixtures of siloxane polymers of formula (3) as described above with liquid, branched methylpolysiloxane polymers ("MDT fluids") comprising a combination of recurring units of the formulae:

(CH$_3$)$_3$SiO$_{1/2}$ ("M")

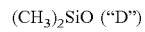(CH$_3$)$_2$SiO ("D")

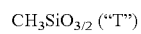CH$_3$SiO$_{3/2}$ ("T")

and containing from 0.1 to 8% by weight of hydroxyl groups. The fluids may be prepared by co-hydrolysis of the corresponding chloro- or alkoxy-silanes, as described, for example, in U.S. Pat. No. 3,382,205. The proportion of MDT fluids added should not exceed 50 parts, preferably of 1 to 20 parts by weight, per 100 parts by weight of the polymer of Formula (3), to achieve improved physical properties and adhesion of the resultant polymers.

The siloxane polymer of the present invention can also comprise mixtures of siloxane polymers of Formula (3) with liquid or solid, branched methylsiloxane polymeric resins comprising a combination of recurring units of the formulae:

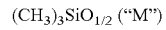(CH$_3$)$_3$SiO$_{1/2}$ ("M")

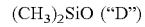(CH$_3$)$_2$SiO ("D")

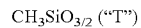CH$_3$SiO$_{3/2}$ ("T")

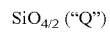SiO$_{4/2}$ ("Q")

and containing from 0.1 to 8% by weight of hydroxyl groups, the fluids may be prepared by co-hydrolysis of the corresponding chloro- or alkoxy-silanes, as described, for example in U.S. Pat. No. 2,676,182. The MDTQ fluid/resin may be added in a proportion not exceeding 50 parts, preferably of 1 to 10 parts by weight, per 100 parts by weight of the polymer of Formula (3) to improve physical properties and adhesion of the resultant polymers. MDTQ fluids/resins can also be mixed with MDT fluids and the polymers of Formula (3).

Finally, the siloxane polymer (i) (i) can comprise mixtures of siloxane polymers of Formula (3) with compatible organic solvents, to form organic polymer/solvent mixtures. These organic solvents are exemplified by organophosphate esters, alkanes, such as hexane or heptane; higher paraffins; and aromatic solvents, such as toluene or benzene. The polymer solvent mixtures can also be added with MDT fluids and/or MDTQ fluids to the polymer of Formula (3). Any of the above mixtures of polymers or polymer/solvents can be prepared by mixing the ingredients prior to emulsification or by emulsifying them individually and then mixing the prepared emulsions.

The at least one self catalytic crosslinker (i)(ii) reactive with (i)(i) to form reaction product (i) is present in the amount of 1 to 5 parts by weight per 100 parts of siloxane polymer. The term "self catalytic crosslinker" means a molecule that has at least one group serving as the catalytic species. While in certain circumstances only one self catalytic crosslinker may be needed to produce an elastomer having the desired physical properties, those skilled in the art will recognize that two or more self catalytic crosslinkers may be added to the reaction mixture to achieve excellent results. In addition, the self catalytic crosslinker or crosslinkers may be added with a conventional catalyst. However, adding the self catalytic crosslinker with a conventional catalyst is not required for the practice of this invention and the compositions contemplated by this invention may in fact be free of said conventional catalysts.

Typical self catalytic crosslinkers include tri or tetra functional compounds, such as $R-Si-(Q)_3$ or $Si-(Q)_4$, where Q is carboxylic, $OC(O)R^4$, e.g., acetoxy and $R^4$ is an alkyl group of 1 to 8 carbon atoms inclusive, preferably methyl, ethyl or vinyl. Other preferred Q groups are the hydroxyl amines, $ON(R^4)_2$, where each R is the same or different alkyl group of 1 to 8 carbon atoms inclusive, e.g., $ON(CH_2CH_3)_2$. Q may also be an oxime group, such as $O-N=C(R^4)_2$, where each $R^4$ is the same or different alkyl group of 1 to 8 carbon atoms inclusive, e.g., $O-N=C(CH_3)(CH_2CH_3)$. Further, Q may be an amine group, such as $N(R^{13})_2$, where $R^{13}$ is the same or different alkyl group of 1 to 8 carbon atoms inclusive or cyclic alkyl group, e.g., $N(CH_3)_2$ or NH(cyclohexyl). Finally, Q may be an acetamido group, $NRC(O)R^4$, where $R^4$ is an alkyl group of 1 to 8 carbon atoms inclusive, e.g. $N(CH_3)C(O)CH_3$.

In addition, partial hydrolysis products of the aforementioned compounds may also function as self catalytic crosslinkers. This would include dimers, trimers, tetramers and the like, for example, compounds of the formula:

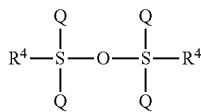

where Q and $R^4$ are defined in the preceding paragraph.

Also useful as self catalytic crosslinkers are those polymeric or copolymeric species containing 3 or more (Q) sites located at either pendant or terminal positions or both on the backbone of a polydiorganosiloxane molecule. Examples of the pendent group include compositions of the following formula:

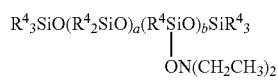

where $R^4$ is the same or different alkyl group of from 1 to 8 carbon atoms inclusive and a is 0 or a positive integer and b is an integer greater than 2. In general, polymeric compositions having either pendent or terminal Q groups may be used in the practice of the present invention, in particular, compounds of the formula:

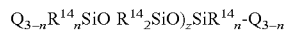

where n is 0, 1, 2 or 3, z is a positive integer, $R^{14}$ is Q or independently the same or different alkyl chain of 1 to 8 carbon atoms inclusive as long as there are at least three Q groups on the molecule. Q is as described above.

Effective self catalytic crosslinkers are those compounds which form tack free elastomers when mixed with functional silicone polymers in the absence of additional catalysts such as tin carboxylates or amines. In the self catalytic crosslinkers, the acetoxy, oxime, hydroxyl amine (aminoxy), acetamide and amide groups catalyze the formation of Si—O—Si bonds in the reactions contemplated by this invention.

One skilled in the art would recognize that the starting polymer itself could be pre-endblocked with self catalytic cross-linking moieties. Optionally, further self-catalytic crosslinkers can be added to such compositions.

The surfactant (c) may be selected from nonionic surfactants, cationic surfactants, anionic surfactants, amphoteric surfactants or mixtures thereof. The surfactant (c) is present in our composition in an amount of 0.5 to 10 parts by weight of siloxane polymer (i)(i) and is preferably present in the amount of 2 to 10 parts.

Most preferred are nonionic surfactants known in the art as being useful in emulsification of polysiloxanes. Useful nonionic surfactants are polyoxyalkylene alkyl ethers, polyoxyalkylene sorbitan esters, polyoxyalkylene esters, polyoxyalkylene alkylphenyl ethers, ethoxylated amides and others.

Cationic and anionic surfactants known in the art as being useful in emulsification of polysiloxanes are also useful as the surfactant in the instant invention. Suitable cationic surfactants are aliphatic fatty amines and their derivatives, such as dodecylamine acetate, octadecylamine acetate and acetates of the amines of tallow fatty acids; homologues of aromatic amines having fatty chains, such as dodecylanalin; fatty amides derived from aliphatic diamines, such as undecylimidazoline; fatty amides derived from disubstituted amines, such as oleylaminodiethylamine; derivatives of ethylene diamine; quaternary ammonium compounds, such as tallow trimethyl ammonium chloride, dioctadecyldimethyl ammonium chloride, didodecyldimethyl ammonium chloride and dihexadecyldimethyl ammonium chloride; amide derivatives of amino alcohols, such as beta-hydroxyethylstearyl amide; amine salts of long chain fatty acids; quaternary ammonium bases derived from fatty amides of disubstituted diamines, such as oleylbenzylaminoethylene diethylamine hydrochloride; quaternary ammonium bases of the benzimidazolines, such as methylheptadecyl benzimidazole hydrobromide; basic compounds of pyridinium and its derivatives, such as cetylpyridinium chloride; sulfonium compounds, such as octadecylsulfonium methyl sulphate; quaternary ammonium compounds of betaine, such as betaine compounds of diethylamino acetic acid and octadecylchloromethyl ether; urethanes of ethylene diamine, such as the condensation products of stearic acid and diethylene triamine; polyethylene diamines and polypropanolpolyethanol amines.

Suitable anionic surfactants are carboxylic, phosphoric and sulfonic acids and their salt derivatives. The anionic surfactants useful in the instant invention are alkyl carboxylates; acyl lactylates; alkyl ether carboxylates; n-acyl sarcosinate; n-acyl glutamates; fatty acid-polypeptide condensates; alkali metal sulforicinates; sulfonated glycerol esters of fatty acids, such as sulfonated monoglycerides of coconut oil acids; salts of sulfonated monovalent alcohol esters, such as sodium oleylisethionate; amides of amino sulfonic acids, such as the sodium salt of oleyl methyl tauride; sulfonated products of fatty acids nitriles, such as palmitonitrile sulfonate; sulfonated aromatic hydrocarbons, such as sodium alphanaphthalene monosulfonate; condensation products of naphthalene sulfonic acids with formaldehyde; sodium octahydroanthracene sulfonate; alkali metal alkyl sulphates, ether sulphates having alkyl groups of 8 or more carbon atoms and alkylarylsulfonates having 1 or more alkyl groups of 8 or more carbon atoms.

Suitable amphoteric surfactants are glycinates, betaines, sultaines and alkyl aminopropionates. These include cocoamphglycinate, cocoamphocarboxy-glycinates, cocoamidopropylbetaine, lauryl betaine, cocoamidopropylhydroxysultaine, laurylsulataine and cocoamphodipropionate.

Amphoteric surfactants commercially available and useful in the instant invention are REWOTERIC® AM TEG, AM DLM-35, AM B14 LS, AM CAS and AM LP produced by SHEREX CHEMICAL CO., Dublin, OH.

In addition to adding the surfactant to the siloxane polymer, the mixture also includes a predetermined amount of water. The water is present in the mixture in an amount of 0.5 to 30 parts by weight of siloxane polymer and is preferably present in the amount of 2 to 10 parts. Water may also be added after mixing, in any amount, to dilute the gel phase.

The reaction product (i) may additionally comprise one or more additives such as in-situ resin reinforcers, stabilizers, e.g., pH stabilizers, fillers and the like may also be added to the mixture. The reaction product (i) is produced by mixing the above components at a sufficiently high shear to transform the mixture into a gel phase and by then diluting the gel with water to the desired silicone content.

The reaction product of (i)(i) a siloxane polymer having at least two —OH groups per molecule, or polymer mixture having at least two —OH groups per molecule, having a viscosity of between 5,000 to 500,000 mPa·s at 25° C., and (i)(ii) at least one self catalyzing crosslinker reactive with (i)(i), additionally comprising (c) a surfactant and (d) water; typically comprises, excluding additives (i.e. on the basis that the (product of (i)(i)+(i)(ii))+(c)+(d) is 100% by weight), 70 to 90% by weight of the reaction product of (i)(i)+(i)(ii), 3 to 10% by weight of (c) and 7 to 20% by weight of component (d). Alternatively, excluding additives (i.e. on the basis that the (product of (i) (i)+(i)(ii)+(c)+(d) is 100% by weight), 80 to 90% by weight of the reaction product of (i) (i)+(i)(ii), 3 to 8% by weight of (c) and 7 to 15% by weight of component (d).

In addition, in situ resin reinforcers, such as methyltrimethoxy silane, vinyltrimethoxy silane, tetraethyl orthosilicate (TEOS), normal propylorthosilicate (NPOS) may be added with the self catalyzing crosslinker. It is believed that adding in situ resin reinforcers to the polydiorganosiloxane/self catalytic crosslinker mixture forms an in situ resin having a highly branched and cross-linked structure, which results in improved physical properties of the elastomer, particularly the tensile, elongation and hardness properties. It also results in improved clarity of the resulting elastomer.

Stabilizers may also be added to the composition. These may comprise any suitable stabilizer, for example a pH stabilizer or any aminosilane containing polymeric or neat aminosilane will function as a stabilizer. Neat aminosilanes include compounds of the formula

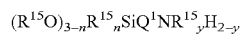

where n and y are independently 0, 1 or 2; $R^{15}$ is the same or different alkyl chain of 1 to 8 carbon atoms inclusive, $Q^1$ is $(CH_2)_b$ or $\{(CH_2)_b N(R^{15})\}_w$, where b is an integer from 1 to 10 and w is from 0 to 3 inclusive.

Polymeric amino silanes may also be used in the practice of the present invention, such as reaction products of silanol functional siloxane fluids and aminosilanes or silanol functional siloxane fluids and alkoxysilanes and aminosilanes. For example, one useful polymeric amino siloxane particularly useful has the formula:

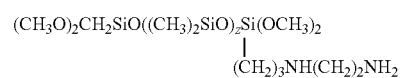

where z is from 3 to 40.

To prepare the binder component of the instant invention, siloxane polymer (i)(i) and the self catalyzing cross-linker (i)(ii) are mixed. Water (d) and surfactant (c) are then added to the siloxane polymer (i)(i) and the self catalyzing crosslinker (i)(ii) is mixed in until a high solids gel phase is formed. Any type of mixing equipment may be used including low shear mixing equipment, such as Turrello™, Neulinger™ or Ross™ mixers. The gel will also exhibit excellent shelf stability and may be stored for long periods of time or even transported if required. The other ingredients of the composition may be introduced during the preparation of the pre-cured dispersion or alternatively may be added into the composition in any suitable order prior to use and after mixing, the resulting composition may be diluted with water to the desired silicone content. Both the dispersion alone and the composition may be stored for long periods of time and will exhibit excellent freeze/thaw stability.

The cross-linked polysiloxane dispersion composition may then be mixed with the other ingredients prior to use or dispensed and will form an elastomeric film upon the evaporation of water. The method of treating a substrate may include applying the cross-linked polysiloxane dispersion to the substrate. As such, the method of treating a substrate may further comprise evaporating water from the cross-linked polysiloxane dispersion composition after the cross-linked polysiloxane dispersion composition is applied to the substrate to form a silicone latex elastomer on the substrate. The step of evaporation of water may be performed under ambient, or atmospheric conditions at the location of the substrate when the cross-linked polysiloxane dispersion composition is applied. Alternatively, the step of evaporation of water may be performed under artificially heated conditions, produced by one or more heaters.

Once prepared, the aforementioned reaction product (i) may be mixed with the other ingredients of the binder component in any suitable order. It will be appreciated that all binder component determined by wt % add up to a total of 100 wt %. The cross-linked polysiloxane dispersion binder component will typically comprise from 30 to 80 wt %, alternatively 30 to 60 wt %, alternatively 35 to 50 wt % of reaction product (i) as hereinbefore described.

The cross-linked polysiloxane dispersion binder composition also comprises one or more fillers (other than hydrophilic powder and/or gels). Suitable fillers include, for the sake of example, colloidal silica, silica powders made by combustion (fumed silica) and precipitation (precipitated silica), semi-reinforcing agents, such as diatomaceous earths or ground quartz. Nonsiliceous fillers may also be added, such as, calcium carbonate, hydrated alumina, magnesium hydroxide, carbon black, titanium dioxide, aluminium oxide, vermiculite, zinc oxide, mica, talcum, iron oxide, barium sulphate, slaked lime, kaolin, calcined kaolin, wollastonite, and hydroxyapatite.

Other fillers which might be used alone or in addition to the above, include the non-reinforcing fillers as herein before described If necessary, liquid alkoxysilanes which are soluble in the siloxane polymer (i)(i) may also be added with the filler to compatibilise the filler with the siloxane polymers.

Typically the filler(s), when present in the binder composition, are present in an amount of from 10 to 200 weight parts of filler per 100 wt parts of siloxane polymer (i)(i), alternatively from 15 to 100 weight parts of filler per 100 wt parts of siloxane polymer (i)(i). Hydrophobing agents may be provided to treat the aforementioned filler(s) to render them hydrophobic as hereinbefore described. Volatile organic amines and volatile inorganic bases are useful as stabilizers for silicas that would yield heat stable elastomers, e.g., $(R^7)_{3-x}N(H)$, where x=0, 1, 2 or 3, $R^7$ is an alkyl or aryl group, such as $(CH_3)_2NH$ or $R^7$ is an alcohol group, such as $N(CH_2CH_2OH)_3$ or $NH(CH_2CH_2OH)_2$. The volatile organic amines include cyclohexylamine, triethylamine, dimethylaminomethylpropanol, diethylaminoethanol, aminomethyl propanol, aminobutanol, monoethanolamine, monoisopropanolamine, dimethylethanolamine, diethanolamine, aminoethylpropanediol, aminomethylpropanesiol, diisopropanolamine, morpholine, tris(hydroxymethyl)aminomethane, triisoproanolamine, triethanolamine, aniline and urea. In addition to the volatile organic amines, volatile inorganic bases, such as ammonia and ammonium carbonate, also yield heat stable elastomers.

The binder composition may also contain one or more rheology modifiers, such as, natural and modified natural materials, such as, for example starch, modified starch, cellulose, modified cellulose, proteins, and modified proteins. Alternatively, the rheology modifiers may be synthetic including, for example, (optionally hydrophobically treated) alkali swellable emulsions of homo-polymers of (meth) acrylic acids and copolymers thereof with methacrylate esters, hydrophobically modified ethoxylated urethane resin, dimeric and trimeric fatty acids and/or imidazolines. Furthermore, the rheology modifiers, when utilized, are present in an amount of from 0.25 wt % to 5 wt % of the composition.

The hydrophilic powder and/or gel of the invention may have been mixed with blends of any binder materials as described above, or combinations thereof with additional binder materials functioning as additional co-binder or hardener. The binder may be a hybrid binder system comprising a siloxane polymer composition or silicone resin composition, as preferred, in combination with an organic binder. Suitable hybrid combinations with organic binders are e.g. (i) organic amine and/or silicone resin having amine groups and/or siloxane polymers having amine groups and epoxy hardener(s), (ii) organic amine and/or silicone resins having amine groups and/or siloxane polymers having amine groups and isocyanate hardener(s), (iii) organic alcohol and/or silicone resins having carbinol groups and/or siloxane polymers having carbinol groups and isocyanate hardener(s), (iv) organic amine and/or silicone resins having amine groups and/or siloxane polymers having amine groups and carboxylic acid hardener(s). The binder of the present invention may be added to the hydrophilic powder and/or gel in form of a solution, dispersion or emulsion and thus contains a dissolving/dispersing/-emulsifying liquid.

When the binder is applied as a solution, it may be in the form of a solution in water, aromatic or non-aromatic solvents, alcohols, ethers, oils, silicone or siloxane fluids or combinations thereof as dissolving liquid, xylene, methoxy propyl acetate (PMA), dibasic esters (DBE) such as esters of adipic acid, glutaric acid, and succinic acid or alcohols such as ethanol, or Si-based fluids. The silicone based fluid may for example be a trimethylsilyl terminated polydimethylsiloxanes having a viscosity at 25° C. of from 100 to 50,000 mPa·s.

When the binder is applied as a dispersion or an emulsion, it may be in the form of a dispersion or an emulsion in water, which may be combined with a co-solvent such as an alcohol, e.g., methanol, ethanol or isopropanol, as dispersing/emulsifying liquid.

Alternatively, the binder of the present invention is free of a dissolving/dispersing/-emulsifying liquid. Such binders are also referred to as being solventless. Preferably the binder is a solventless siloxane or silicone-based binder. A commercially available solventless alkoxy siloxane binder product is US-CF-2403 resin of Dow Corning®, Midland, MI, USA.

Prior to use the binder may be stored as a one part composition but alternatively may be stored in two or more parts until immediately prior to use when the parts are mixed together and utilised as required by for example being applied directly onto a substrate or being introduced into further ingredients of e.g. a paint composition. Each part may be either a solid or liquid. When the binder is stored in two or more parts, these parts are mixed together to form a curable composition immediately prior to use. The two or more parts may contain binder ingredients in any combination providing when present reactive polymer (or resin) which is not in the same part as both the cross-linker and catalyst. For example the polymer/resin may be in a first part with the hydrophilic powder and/or gel as hereinbefore described and any reinforcing filler or non-reinforcing filler and the second part may contain a cure package. Alternatively there could be a three part composition in which part of the polymer is stored with the hydrophilic powder and/or gel as hereinbefore described in a first part; a second part could include the remaining polymer and reinforcing or non-reinforcing fillers and the third part comprise the cross-linker and polymer.

The composition of the present invention typically comprises 1.0 to 80.0% by weight of the hydrophilic powder and/or gel and 20.0 to 99.0% by weight of the binder, preferably 1.0 to 20.0% by weight of the hydrophilic powder and/or gel and 80.0 to 99.0% by weight of the binder, more preferred 5.0 to 10.0% by weight of the hydrophilic powder and/or gel and 90.0 to 95.0% by weight of the binder.

When organic (silicon free) co-binders or hardeners are present these may be present in an amount of from 2 to 40% by weight of the total composition.

In case of solution, dispersion or emulsion type binders, the composition contains from 15.0 to 90.0% by weight of dissolving/dispersing/emulsifying liquid, based on the total weight of the binder, preferably 30.0 to 60.0% by weight.

In addition to the above mentioned components, materials the composition may also comprise non-porous particles. Preferred non-porous particles are, e.g., particles of fumed silica. Unlike the hydrophilic powder and/or gel described above fumed silicas are non-porous and are used as thickeners and/or re-enforcing materials in applications such as paints or sealants. These materials are not known as insulative fillers.

In addition to the components mentioned above the composition of the present invention may also comprise one or more additives selected from thickeners, pigments, additional catalysts, additional reinforcing and/or non-reinforcing filler(s), flame retardants, additional water or solvent, foam stabilizers, and/or any other additional insulating fillers (i.e. excluding the hydrophilic powder and/or gel as defined above), wherein the insulating fillers preferably comprise hollow spheres, beads or nanotubes of any suitable material, preferably glass, organic materials, ceramics, plastics and/or carbon, wherein the amount of such additives in the composition typically is in the range of 0.1 to 80% by weight, based on the weight of the total composition, preferably in the range of 0.1 to 60% by weight, more preferred 0.1 to 50% by weight. The aforementioned amounts of the essential binder and hydrophilic powder and/or gel components of the present invention will then be adapted accordingly.

A composition of the invention may thus comprise:
- 0.1 to 50% by weight of thickener(s), preferably 0.1 to 1 0.0%,
- 0.1 to 80% by weight of pigment(s), preferably 1.0 to 50%,
- 0.1 to 80% by weight of additional reinforcing and/or non-reinforcing filler(s), preferably 1.0 to 50%,
- 0.1 to 20% by weight of additional catalyst(s), preferably 0.1 to 5.0%,
- 0.1 to 50% by weight of flame retardant(s), preferably 1.0 to 10.0,
additional water or solvent,
- 0.1 to 20% by weight of foam stabilizer(s), preferably 0.1 to 5.0%, and/or
- 0.1 to 60% by weight of additional insulating filler(s), preferably 0.1 to 20.0%,
the weight % being based on the total weight of the composition.

The additional insulating filler comprises hollow spheres, beads or nanotubes of any suitable material, preferably glass, organic materials, ceramics, plastics and/or carbon.

The composition of the present invention may be liquid or solid.

The other inorganic or organic binder systems which may be blended with the silicon-based binders of the present invention may be waterborne systems, solvent borne systems, solventless systems or dispersion/emulsion systems. Suitable solvents may be selected from xylene, methoxy propyl acetate (PMA), dibasic esters (DBE) such as esters of adipic acid, glutaric acid, and succinic acid, alcohols, such as ethanol, and fluids such as Si-based fluids. The silicone based fluid may for example be a trimethylsilyl terminated polydimethylsiloxanes having a viscosity at 25° C. of from 100 to 50,000 mPa·s.

The present invention also provides a composite comprising the composition hydrophilic powder and/or gel and silicon-based binder as defined herein.

Further, the invention provides a method of preparing a composition as defined in claim 1 comprising
mixing hydrophilic powder and/or gel with a binder comprising a silicon compound as hereinbefore described and
dispersing or emulsifying the mixture.

The present invention also provides the use of the compositions of the invention as thermally or acoustically insulating material, paints, coatings, foamed articles, formed articles, injected articles, gaskets, sealants, adhesives, marine and piping.

Industries where such insulating compositions can be used with advantage comprise marine, building and construction and transportation including automotive, container and caravan applications. There is also provided a method comprising curing a material comprising or consisting of the composition as described above to form a product and using the product for thermal and/or acoustical insulation. As indicated above the thermal and/or acoustical insulation is used in an application selected from the group consisting of paints, coatings, foamed articles, injected articles, gaskets, sealants, adhesives, marine and piping. There is also provided a coated substrate obtained by the application of a material comprising or consisting of the composition in herein on to said substrate.

There is also provided a product obtained from a material comprising or consisting of the composition as described herein as well as an article comprising or consisting of the product. In the latter case it is particularly preferred if the product is used for thermal and/or acoustic insulation. There is also provided herein a substrate surface coated with a material comprising or consisting of the composition as described above.

There is also provided a method of making a substrate thermally or acoustically insulating, by applying a coating composition consisting of or comprising the composition described herein on to the substrate. The coating composition may be a paint, coating, sealant, adhesive or gasket and the like. There is also provided a method of making an article thermally or acoustically insulating, the method comprising: combining the composition as hereinbefore described in a formulation for making the article then making the article with the formulation. The article may be a gasket, acoustical tile or the like.

Dependent on the nature of the composition any suitable method of application may be used, for example a coating composition might be applied by mixing, spraying, injection, rolling, dipping, spinning or knife devices.

The binder composition as hereinbefore described may be used, e.g. applied on to a substrate without additional ingredients. However the binder composition may also be stored as a single part of a multi-part composition. For example if spraying with a spray gun the binder may be provided to the spray gun as one part of a multi-composition which is mixed in a mixing chamber before application on to a substrate.

Further aspects of the present invention are disclosed in the following paragraphs. The references to numbered paragraphs relate to the paragraphs in the following section.

Paragraph 1. A composition comprising a binder comprising one or more siloxane polymers, silicone resins, silicone based elastomers, and mixtures thereof, wherein said binder optionally comprises one or more cross-linker components comprising a silane and/or a siloxane containing silicon-bonded hydrolysable groups; and a hydrophilic powder and/or gel selected from one or more amorphous, porous hydrophilic silica(s) having a thermal conductivity at 20° C. and atmospheric pressure of 0.001 to 0.15 W/m·K and a surface area (SBET) of between 200 and 1500 $m^2/g$, one or more hydrophilic aerogel(s) and mixtures thereof.

Paragraph 2. The composition of paragraph 1, wherein the hydrophilic amorphous, porous hydrophilic silica has a pore size distribution of from 0.1 to 100 nm.

Paragraph 3. The composition of paragraphs 1 or 2, wherein the hydrophilic aerogel is an inorganic or organic aerogel, in particular silica aerogel, magnesia aerogel, titania aerogel, zirconia aerogel, alumina aerogel, chromia aerogel, tin dioxide aerogel, lithium dioxide aerogel, ceria aerogel and vanadium pentoxide aerogel, and mixtures of any two or more thereof, or an aerogel based on organic carbon containing polymers (carbon aerogel).

Paragraph 4. The composition of any of preceding paragraphs 1 to 3, wherein the binder contains one or more siloxane polymers and/or silicone resins having at least one but preferably at least two carbinol groups (C—OH) or silanol groups (Si—OH) or Si-hydrolysable groups or a mixture thereof.

Paragraph 5. The composition of paragraph 4, wherein the siloxane polymer and/or a silicone resin comprises two or more silanol groups and/or Si-hydrolysable reactive groups the binder concerned is condensation curable and additionally comprises a cross-linking compound, a condensation cure catalyst and optionally reinforcing filler or non-reinforcing filler.

Paragraph 6. The composition of paragraph 1, 2 or 3, wherein the binder contains one or more siloxane polymers and/or silicone resins having at least one, preferably at least two alkenyl groups (Si-alkenyl) and/or silicon bonded hydrogens (Si—H).

Paragraph 7. The composition of paragraph 6, wherein the binder the siloxane polymer and/or a silicone resin comprises two or more having at least one but preferably at least two alkenyl groups (Si-alkenyl) and/or silicon bonded hydrogen the binder concerned is addition curable and additionally comprises a cross-linking compound, a Pt group cure catalyst optionally reinforcing filler or non-reinforcing filler.

Paragraph 8. The composition of any of preceding paragraphs 1 to 7, wherein the binder is a) a solution, in particular in water, organic solvent or a non-reactive silicone or siloxane fluid, wherein the solution optionally contains a surfactant, b) an emulsion, in particular in water, optionally containing a surfactant, or c) a dispersion, in particular in water or organic solvent or a non-reactive silicone or siloxane fluid, optionally containing a surfactant.

Paragraph 9. The composition of paragraph 8, wherein the solution, dispersion or emulsion type binder contains 15.0 to 90.0% by weight of dissolving/dispersing/emulsifying liquid, based on the total weight of the binder, preferably 30.0 to 60.0% by weight.

Paragraph 10. The composition of any of preceding paragraphs 1 to 9, wherein the binder comprises a silicone based elastomer.

Paragraph 11. The composition of any of preceding paragraphs 1 to 10, wherein the binder further comprises additional inorganic or organic components, in particular epoxy resins, amino-group containing components, carboxylic acids, isocyanates, specifically organic amines, organic epoxy resins, organic isocyanates, organic carboxylic acids, organic acetals, organic anhydrides, organic aldehydes, polyolefins, thermoset and/or thermoplastic components suitable for use as binders and/or hardeners.

Paragraph 12. The composition of paragraph 11, wherein the composition is blended with inorganic or organic binder systems, in particular waterborne systems, solvent borne systems, solventless systems or emulsion systems, solid state binder systems, in particular powder and pellet binder systems.

Paragraph 13. The composition of any of preceding paragraphs 1 to 12, wherein the composition comprises 1.0 to 80.0% by weight of the hydrophilic powder and/or gel and 20.0 to 99.0% by weight of the binder, preferably 1.0 to 20.0% by weight of the hydrophilic powder and/or gel and 80.0 to 99.0% by weight of the binder, more preferred 5.0 to 10.0% by weight of the hydrophilic powder and/or gel and 90.0 to 95.0% by weight of the binder.

Paragraph 14. The composition of any of preceding paragraphs 1 to 13, wherein the hydrophilic powder and/or gel comprises aggregate and/or agglomerate particles having an average size from 0.5 μm to 3000 μm, as determined by way of laser light scattering (ASTM D4464-15).

Paragraph 15. The composition of any of preceding paragraphs 1 to 14, wherein the hydrophilic powder and/or gel is an amorphous, porous hydrophilic silica and/or a hydrophilic silica aerogel having a density of 0.02 to 0.2 g/cm$^3$, and/or a BET surface area from 100 m$^2$/g to 1500 m$^2$/g or greater, preferably in the range of 200 to 1000 m$^2$/g, and/or a thermal conductivity from 0.004 to 0.05 W/m·K at atmospheric pressure and/or a pore size distribution of 1 to 75 nm.

Paragraph 16. The composition of any of paragraphs 1 to 15, wherein the composition also comprises one or more additives selected from thickeners, pigments, additional catalysts, additional reinforcing and/or non-reinforcing filler(s), flame retardants, additional water or solvent, foam stabilizers, and/or any other additional insulating fillers, wherein the insulating fillers preferably comprise hollow spheres, beads or nanotubes of any suitable material, preferably glass, organic materials, ceramics, plastics and/or carbon, wherein the amount of such additives in the composition typically is in the range of 0.1 to 80% by weight, based on the weight of the total composition, preferably in the range of 0.1 to 60% by weight, more preferred 0.1 to 50% by weight.

Paragraph 17. Use of a composition in accordance with any of paragraphs 1 to 16 as or in thermally or acoustically insulating material, paints, coatings, foamed articles, formed articles, injected articles, gaskets, sealants, adhesives, marine and piping.

Paragraph 18. A coated substrate obtained by the application of a material comprising or consisting of the composition in accordance with any one of paragraphs 1 to 16 on to said substrate.

Paragraph 19. A product obtained from a material comprising or consisting of the composition in accordance with any one of paragraphs 1 to 16.

Paragraph 20. An article comprising or consisting of the product in accordance with paragraph 19.

Paragraph 21. A substrate surface coated with a material comprising or consisting of the composition in accordance with any one of paragraphs 1 to 16.

The following examples illustrate the present invention.

EXAMPLES

The materials used in the examples are as follows:
Film-Forming Material:
DOWSIL™ 8005 Waterborne Resin: A waterborne elastomeric siloxane emulsion obtained from Dow Corning Corporation Midland, MI, USA.

WORLEECRYL® CH-X 2158: an aqueous acrylic binder obtained from Worlée GmbH, Lauenburg, Germany.

DOWSIL™ 2405 Resin: A methoxy functional DT type silicone resin having a viscosity of 300 mPa·s at 25° C. obtained from Dow Corning®, Midland, MI, USA.

XIAMETER® RBL-1551 Part A: Base Part of a 2-part addition cured Liquid silicone rubber composition obtained from Dow Corning Corporation Midland, MI, USA.

XIAMETER® RBL-1551 Part B: Cure Package of a 2-part addition cured Liquid silicone rubber Catalyst obtained from Dow Corning Corporation, Midland, MI, USA DOWSIL™ RSN-0804 Resin: a —OH functional silicone resin obtained from Dow Corning Corporation, Midland, MI, USA.

EPICOTE® 828: an unmodified bisphenol A-epichlorohydrin epoxy resin obtained from Hexion Inc., Columbus, OH, US WORLÉECURE® VP 2246: a low viscosity, high performance cycloaliphatic amine polymer obtained from Worlée GmbH, Lauenburg, Germany DOWSIL™ 3055 Resin: An amine functional silicone resin obtained from Dow Corning Corporation, Midland, MI, USA Insulative Filler:

QUARTZENE® Z1: an amorphous, porous hydrophilic silica powder commercially available from Svenska Aerogel AB, Gavle, Sweden having properties within the scope of the amorphous, porous hydrophilic silica as described herein. Specifically, the material (CAS No. 112926-00-9), as characterized in its Product Data Sheet of 20 Oct. 2016, has a tapped density at 20° C. and $P_{atm}$ of 0.06 to 0.10 g/ml; a thermal conductivity at 20° C. and $P_{atm}$ of 0.025 to 0.03 W/m K; is stable up to about 900° C., has a surface area (BET) of 200 to 350 $m^2$/g; a particle size distribution of 1 to 40 μm, with d(10) of about 2 μm, d(50) of about 4 to 6 μm and d(90) of about 10 to 14 μm; a pore size distribution of about 1 to 50 nm; and a porosity of about 95 to 97%.

ENOVA® IC3120: an hydrophobic silica aerogel obtained from Cabot Corp., Boston, MA, US 3M™ Microsphere Glass Bubbles K Series K20: glass microspheres obtained from 3M St Paul, MI, US Thickener:

ROHAGIT® SD 15: a polyacrylate based thickener obtained from Synthomer Essex, UK Catalyst:

Titanium n-butoxide (TnBT) obtained from Dorf Ketal Specialty Catalysts LLC, Houston, TX, US Preparation In the following examples the compositions were prepared as follows:

Unless indicated otherwise, the ingredients of each example were combined and mixed by pouring the solid ingredients (e.g. aerogels) into the liquid phase and then were mixed in a Banbury mixer from CW Brabender Instruments Inc., NJ, USA at 500 rpm for up to 20 minutes.

Example 1

This is an example of the present invention and is made from a silicone in water based emulsion binder to which hydrophilic powder and/or gel and thickener have been introduced.

| Ingredients | Content (wt %) | Filler Type present |
|---|---|---|
| DOWSIL ™ 8005 Waterborne Resin | 87 | |
| QUARTZENE ® Z1 | 12 | amorphous, porous hydrophilic silica |
| ROHAGIT ® SD 15 | 1 | |

Example 2 (Comparative)

This example is a comparative to example 1 and is made from a silicone in water based emulsion binder to which hydrophobic aerogel and thickener have been introduced.

| Material | Content (wt %) | Filler Type present |
|---|---|---|
| DOWSIL ™ 8005 Waterborne Resin | 89 | |
| ENOVA ® IC3120 | 10 | hydrophobic aerogel |
| ROHAGIT ® SD 15 | 1 | |

Example 3 (Comparative)

This example is a comparative to example 1 and is made from a silicone in water based emulsion binder to which a glass bead filler material (non-aerogel) and thickener were introduced.

| Material | Content (wt %) | Filler Type present |
|---|---|---|
| DOWSIL ™ 8005 Waterborne Resin | 69 | |
| 3M ™ Microsphere Glass Bubbles K Series K20 | 30 | glass beads |
| ROHAGIT ® SD 15 | 1 | |

Example 4 (Comparative)

This example is a comparative to example 1 and is made from an aqueous, organic acrylic based binder to which a hydrophobic aerogel filler material and thickener were introduced

| Material | Content (wt %) | Filler Type present |
|---|---|---|
| WORLÉECRYL ® CH-X 2158 | 79 | |
| ENOVA ® IC3120 | 10 | hydrophobic aerogel |
| ROHAGIT ® SD 15 | 1 | |

Example 5 (Comparative)

This example is a comparative to example 1 and is made from an aqueous, organic acrylic based emulsion binder to which a hydrophilic powder and/or gel filler material and thickener were introduced

| Material | Content (wt %) | Filler Type present |
|---|---|---|
| WORLÉECRYL ® CH-X 2158 | 79 | |
| QUARTZENE ® Z1 | 10 | amorphous, porous hydrophilic silica |
| ROHAGIT ® SD 15 | 1 | |

Example 6

This is an example of the present invention and is made from an alkoxy terminated silicone resin solventless binder to which hydrophilic powder and/or gel and a titanate catalyst were introduced

| Material | Content (wt %) | Filler Type present |
|---|---|---|
| DOWSIL ™2405 Resin | 79 | |
| QUARTZENE ® Z1 | 10 | amorphous, porous hydrophilic silica |
| TnBT | 1 | |

Example 7

This is an example of the present invention and is made from a two part addition cure silicone composition binder to which hydrophilic powder and/or gel was introduced

| Material | Content (wt %) | Filler Type present |
|---|---|---|
| XIAMETER ® RBL-1551 Part A | 45 | hydrophobically treated precipitated silica (non-aerogel) |
| QUARTZENE ® Z1 | 10 | Amorphous, porous hydrophilic silicon dioxide |
| XIAMETER ® RBL-1551 Part B | 45 | |

Example 8 (Comparative)

This is a comparative example containing an epoxy resin to which hydrophilic powder and/or gel and a cycloaliphatic amine polymer were introduced.

| Material | Content (wt %) | Filler Type present |
|---|---|---|
| EPICOTE ® 828 | 54 | |
| QUARTZENE ® Z1 | 20 | amorphous, porous hydrophilic silica |
| WORLÉECURE ® VP 2246 | 26 | |

Example 9 (Comparative)

This is a comparative example containing the same resin and polymer as Example 8 but containing a hydrophobic aerogel filler material instead of the amorphous, porous hydrophilic silica.

| Material | Content (wt %) | Filler Type present |
|---|---|---|
| EPICOTE ® 828 | 60 | |
| ENOVA ® IC3120 | 10 | hydrophobic aerogel |
| WORLÉECURE ® VP 2246 | 30 | |

Example 10

This is a hybrid example of the present invention containing an epoxy resin to which amorphous, porous hydrophilic silica, a cycloaliphatic amine polymer and a silicone resin were introduced.

| Material | Content (wt %) | Filler Type present |
|---|---|---|
| EPICOTE ® 828 | 54 | |
| Quartzene ® Z1 | 20 | amorphous, porous hydrophilic silica |
| WORLÉECURE ® VP 2246 | 10 | |
| DOWSIL ™3055 Resin | 16 | |

The formulations according to the above Examples and comparative formulations were tested for relevant properties.

Miscibility

The miscibility of the ingredients in each example was visually assessed to determine the quality of the blending of the ingredients by the Banbury mixer i.e. the miscibility of the binder with the other ingredient(s) using the following indicators, whereby:—

−=not miscible

+=miscible and viscosity remains stable for a period of from 3 to 7 days

++=miscible and viscosity remains stable for at least 3 months

Film Integrity

Films of each example, of approximately 4 mm thickness, were applied onto Q-Lab R-46 cold rolled steel (Westlake, Ohio USA) substrates and were left to dry/cure. After 3 days of drying/curing at ambient temperature the film appearance was visually assessed;

−−=strong cracking (>mm cracks)

−=cracking (0.1 to 1.0 mm cracks)

++=no cracking

Insulative Properties

The thermal conductivity of the Insulative fillers which, it was found were indicative of the thermal conductivity of the films themselves are provided. These values are taken from the current datasheets of the respective fillers at the time of drafting this document. It is understood that such measurements are determined using ASTM E1225-13.

Limit of Film Thermal Stability (° C.)

Samples of each example composition were applied as 4 mm films onto Q-Lab R-46 cold rolled steel (Westlake, Ohio USA) substrates. The films were left to cure/dry on the substrate surfaces for a period of 24 hours. Subsequent to the curing/drying period, coated substrates were placed onto a fixed temperature hotplate type PZ 28-3TD from Harry Gestigkeit GMBH, Dusseldorf, GER for a period of 8 hours to determine whether or not the films remained thermally stable during said 8 hour period. The hotplates first measured samples at 120° C. Replacement samples were then measured at 20° C. intervals up to 300° C. and the limit of Film Thermal Stability of films was noted when discoloration, delamination and/or cracks were visible after the 8 hour period.

The results determined are provided in the Results Table below.

Results Table

| Examples | Composition Miscibility | Film Integrity | Thermal Conductivity of Insulative fillers used (W/m · K) | Limit of film Thermal Stability (° C.) |
|---|---|---|---|---|
| 1 | ++ | ++ | 0.026 | >300° C. |
| 2 | + | -- | 0.012 | 220° C. |
| 3 | ++ | - | 0.065 | >300° C. |
| 4 | ++ | ++ | 0.012 | 120° C. |
| 5 | - | N.A | 0.026 | N.A. |
| 6 | ++ | ++ | 0.026 | >300° C. |
| 7 | ++ | ++ | 0.026 | >300° C. |
| 8 | + | ++ | 0.026 | 120° C. |
| 9 | + | - | 0.012 | 120° C. |
| 10 | ++ | ++ | 0.026 | 180° C. |

N.A. = not analyzed as no film was able to be applied nor evaluated (gelling)

It was found that silicone compositions generally gave the best miscibility and film integrity results. However, some organic based systems provided similar results for miscibility and film integrity but were significantly inferior in respect to thermal stability.

As mentioned, the compositions of the present invention can be used for production of paints, coatings, including safe touch coatings, foamed articles, pipes, storage tanks, injected articles, gaskets, sealants, adhesives, marine and piping applications.

They provide thermally, acoustically insulating or barrier properties.

The compositions may be in solid, powder form or in liquid form.

As applicable they may be applied using mixing, spraying, rolling, dipping, spinning or knife devices. The applied coatings can dry at room or elevated temperature.

Industries where such insulating compositions can be used with advantage comprise marine, building and construction and transportation including automotive, container and caravan applications.

The invention claimed is:

1. A composition comprising:
    a binder comprising one or more siloxane polymers, silicone resins, silicone based elastomers, or mixtures thereof, wherein said binder optionally comprises one or more cross-linker components comprising a silane and/or a siloxane containing silicon-bonded hydrolysable groups; and
    a hydrophilic powder and/or gel selected from one or more amorphous, porous hydrophilic silica(s) having a thermal conductivity at 20° C. and atmospheric pressure of 0.001 to 0.15 W/m·K and a surface area ($S_{BET}$) of between 200 and 1500 m²/g, one or more hydrophilic aerogel(s) or mixtures thereof,
    wherein the binder is a solution, an emulsion, or a dispersion in water,
    wherein the hydrophilic powder and/or gel comprises aggregate and/or agglomerate particles having an average size from 0.5 µm to 3000 µm, as determined by way of laser light scattering (ASTM D4464-15); and
    wherein the hydrophilic powder and/or gel comprises a surface having hydrophilic groups.

2. The composition of claim 1, wherein the hydrophilic amorphous, porous hydrophilic silica is present and has a pore size distribution of from 0.1 to 100 nm.

3. The composition of claim 1, wherein the hydrophilic aerogel is present and is an inorganic or organic aerogel selected from silica aerogel, magnesia aerogel, titania aerogel, zirconia aerogel, alumina aerogel, chromia aerogel, tin dioxide aerogel, lithium dioxide aerogel, ceria aerogel and vanadium pentoxide aerogel, and mixtures of any two or more thereof, or an aerogel based on organic carbon containing polymers (carbon aerogel).

4. The composition of claim 1, wherein the binder contains one or more siloxane polymers and/or silicone resins having at least one carbinol group (C—OH) or silanol group (Si—OH) or Si-hydrolysable group or a mixture thereof.

5. The composition of claim 4, wherein the siloxane polymer and/or silicone resin comprises two or more silanol groups and/or Si-hydrolysable reactive groups, wherein the binder is condensation curable and additionally comprises a cross-linking compound, a condensation cure catalyst and optionally reinforcing filler or non-reinforcing filler.

6. The composition of claim 1, wherein the binder contains one or more siloxane polymers and/or silicone resins having at least one alkenyl group (Si-alkenyl) and/or silicon bonded hydrogen (Si—H).

7. The composition of claim 6, wherein the siloxane polymer and/or silicone resin comprises two or more alkenyl groups (Si-alkenyl) and/or silicon bonded hydrogens, wherein the binder is addition curable and additionally comprises a cross-linking compound, a Pt group cure catalyst and optionally reinforcing filler or non-reinforcing filler.

8. The composition of claim 1, wherein the solution, emulsion or dispersion contains a surfactant.

9. The composition of claim 8, wherein the solution, dispersion or emulsion contains 15.0 to 90.0% by weight of dissolving/dispersing/emulsifying liquid, based on the total weight of the binder.

10. The composition of claim 1, wherein the binder comprises a silicone based elastomer.

11. The composition in accordance with claim 1, wherein the binder further comprises additional inorganic or organic components selected from epoxy resins, amino-group containing components, carboxylic acids, isocyanates, organic amines, organic epoxy resins, organic isocyanates, organic carboxylic acids, organic acetals, organic anhydrides, organic aldehydes, polyolefins, or thermoset and/or thermoplastic components.

12. The composition of claim 11, wherein the composition is blended with inorganic or organic binder systems selected from waterborne systems, solvent borne systems, solventless systems or emulsion systems, and/or solid state binder systems.

13. The composition of claim 1, wherein the composition comprises 1.0 to 80.0% by weight of the hydrophilic powder and/or gel and 20.0 to 99.0% by weight of the binder.

14. The composition of claim 1, wherein the hydrophilic powder and/or gel is an amorphous, porous hydrophilic silica and/or a hydrophilic silica aerogel having a density of 0.02 to 0.2 $g/cm^3$, and/or a BET surface area from 100 $m^2/g$ to 1500 $m^2/g$ or greater, and/or a thermal conductivity from 0.004 to 0.05 W/m K at atmospheric pressure and/or a pore size distribution of 1 to 75 nm.

15. The composition of claim 1, further comprising one or more additives selected from thickeners, pigments, additional catalysts, additional reinforcing and/or non-reinforcing filler(s), flame retardants, additional water or solvent, foam stabilizers, and/or any other additional insulating fillers.

16. A coated substrate obtained by the application of a material comprising or consisting of the composition in accordance with claim 1 onto said substrate.

17. A product comprising or consisting of the composition in accordance with claim 1.

18. An article comprising or consisting of the product in accordance with claim 17.

19. A substrate surface coated with a material comprising or consisting of the composition in accordance with claim 1.

\* \* \* \* \*